US011739964B1

(12) United States Patent
Donahue et al.

(10) Patent No.: US 11,739,964 B1
(45) Date of Patent: Aug. 29, 2023

(54) HVAC SYSTEM ZONING PROTECTION

(71) Applicant: Alarm.com Incorporated, Tysons, VA (US)

(72) Inventors: Harrison Wayne Donahue, Attleboro, MA (US); Daniel Marc Goodman, Needham, MA (US); Craig Carl Heffernan, Oregon City, OR (US); Liam Shea Daly, Needham, MA (US); Grant Rudd, Braintree, MA (US)

(73) Assignee: Alarm.com Incorporated, Tysons, VA (US)

( * ) Notice: Subject to any disclaimer, the term of this patent is extended or adjusted under 35 U.S.C. 154(b) by 242 days.

(21) Appl. No.: 16/940,552

(22) Filed: Jul. 28, 2020

Related U.S. Application Data

(60) Provisional application No. 62/879,666, filed on Jul. 29, 2019.

(51) Int. Cl.
| | |
|---|---|
| *F24F 11/00* | (2018.01) |
| *F24F 13/02* | (2006.01) |
| *F24F 13/10* | (2006.01) |
| *F24F 11/49* | (2018.01) |
| *F24F 11/56* | (2018.01) |
| *F24F 11/64* | (2018.01) |
| *F24F 11/65* | (2018.01) |
| *F24F 11/72* | (2018.01) |
| *F24F 11/81* | (2018.01) |
| *F24F 11/79* | (2018.01) |
| *F24F 11/80* | (2018.01) |
| *G05B 19/042* | (2006.01) |

(Continued)

(52) U.S. Cl.
CPC ............ *F24F 11/49* (2018.01); *F24F 11/52* (2018.01); *F24F 11/56* (2018.01); *F24F 11/64* (2018.01); *F24F 11/65* (2018.01); *F24F 11/72* (2018.01); *F24F 11/79* (2018.01); *F24F 11/80* (2018.01); *F24F 11/81* (2018.01); *F24F 13/02* (2013.01); *F24F 13/10* (2013.01); *G05B 19/042* (2013.01); *F24F 2110/10* (2018.01); *F24F 2110/40* (2018.01); *G05B 2219/2614* (2013.01)

(58) Field of Classification Search
CPC .. F24F 11/49; F24F 11/52; F24F 11/56; F24F 11/64; F24F 11/65; F24F 11/72; F24F 11/79; F24F 11/80; F24F 11/81; F24F 13/02; F24F 13/10
See application file for complete search history.

(56) References Cited

U.S. PATENT DOCUMENTS

| | | |
|---|---|---|
| 4,164,172 A | 8/1979 | Anderten et al. |
| 4,995,307 A | 2/1991 | Floyd |

(Continued)

*Primary Examiner* — Mark A Connolly
(74) *Attorney, Agent, or Firm* — Fish & Richardson P.C.

(57) ABSTRACT

Methods, systems, and apparatus, including computer programs encoded on computer storage media, for monitoring an HVAC system. One of the methods includes receiving pressure data from one or more sensors monitoring a supply air duct of an HVAC system at a property that indicates a pressure in the HVAC system; determining, using the pressure data, that the pressure satisfies a pressure threshold for the HVAC system; and in response to determining that the pressure satisfies the pressure threshold, adjusting an actuator-controlled damper between the supply air duct and a return air duct or adjusting a fan speed of the HVAC system.

20 Claims, 6 Drawing Sheets

(51) Int. Cl.
*F24F 11/52* (2018.01)
*F24F 110/10* (2018.01)
*F24F 110/40* (2018.01)

(56) References Cited

U.S. PATENT DOCUMENTS

| | | | |
|---|---|---|---|
| 5,971,067 A * | 10/1999 | Rayburn | F24F 11/30 165/250 |
| 7,113,090 B1 | 9/2006 | Saylor et al. | |
| 8,596,079 B2 | 12/2013 | Beam | |
| 8,695,888 B2 * | 4/2014 | Kates | F24F 1/022 62/186 |
| 9,064,394 B1 | 6/2015 | Trundle | |
| 9,677,777 B2 | 6/2017 | Karamanos et al. | |
| 9,976,763 B2 * | 5/2018 | Leeland | F24F 11/62 |
| 10,126,009 B2 | 11/2018 | Flaherty et al. | |
| 10,281,166 B1 | 5/2019 | Hutz | |
| 10,845,077 B1 | 11/2020 | Hutz | |
| 10,995,968 B2 * | 5/2021 | Ray | F24F 3/044 |
| 2002/0134849 A1 * | 9/2002 | Disser | G05D 23/1902 236/47 |
| 2006/0183419 A1 | 8/2006 | Kettler | |
| 2007/0072541 A1 | 3/2007 | Daniels, II et al. | |
| 2008/0004904 A1 | 1/2008 | Tran | |
| 2008/0078332 A1 * | 4/2008 | Conger | A01K 1/031 119/416 |
| 2008/0161976 A1 | 7/2008 | Stanimirovic | |
| 2009/0065595 A1 | 3/2009 | Kates | |
| 2010/0061865 A1 | 3/2010 | Goldman et al. | |
| 2010/0082162 A1 * | 4/2010 | Mundy | F24F 3/044 700/277 |
| 2012/0046792 A1 * | 2/2012 | Secor | F24F 11/62 702/45 |
| 2015/0060037 A1 * | 3/2015 | Norrell | F24F 11/72 165/212 |
| 2015/0075373 A1 | 3/2015 | Miller | |
| 2015/0282440 A1 * | 10/2015 | Shelor | A01G 9/18 47/17 |
| 2015/0304171 A1 | 10/2015 | Kim et al. | |
| 2016/0025363 A1 | 1/2016 | Kates | |
| 2019/0195528 A1 * | 6/2019 | Puranen | F24F 11/81 |
| 2021/0071885 A1 | 3/2021 | Hutz | |

* cited by examiner

300

```
┌─────────────────────────────────────────────────────────────────┐
│ Provide control information to an HVAC system that indicates a  │
│ property for a control setting of the HVAC system               │
│                                                             302 │
└─────────────────────────────────────────────────────────────────┘
                                  │
                                  ▼
┌─────────────────────────────────────────────────────────────────┐
│ In response to providing control information to the HVAC        │
│ system, receive data representing an error associated with a    │
│ control setting of the HVAC system                              │
│                                                             304 │
└─────────────────────────────────────────────────────────────────┘
                                  │
                                  ▼
┌─────────────────────────────────────────────────────────────────┐
│ In response to receiving the data representing the error        │
│ associated with the HVAC system, generate an alert              │
│ corresponding to the error associated with the HVAC system     │
│                                                             306 │
└─────────────────────────────────────────────────────────────────┘
                                  │
                                  ▼
┌─────────────────────────────────────────────────────────────────┐
│ Provide the alert corresponding to the error associated with    │
│ the HVAC system to a device to cause the device to present      │
│ information about the error                                     │
│                                                             308 │
└─────────────────────────────────────────────────────────────────┘
```

```
┌─────────────────────────────────────────────────────────────────┐
│ Receive pressure data from one or more sensors monitoring a     │
│ supply air duct, a return air duct, or both, of an HVAC system  │
│ at a property that indicates a pressure in the HVAC system      │
│                                                             402 │
└─────────────────────────────────────────────────────────────────┘
                                │
                                ▼
┌─────────────────────────────────────────────────────────────────┐
│ Determine, using the pressure data, that the pressure satisfies │
│ a pressure threshold for the HVAC system                        │
│                                                             404 │
└─────────────────────────────────────────────────────────────────┘
                                │
                                ▼
┌─────────────────────────────────────────────────────────────────┐
│ In response to determining that the pressure satisfies the      │
│ pressure threshold, adjust an actuator-controlled damper        │
│ between the supply air duct and the return air duct or adjust   │
│ a fan speed of the HVAC system                              406 │
└─────────────────────────────────────────────────────────────────┘
                                │
                                ▼
┌─────────────────────────────────────────────────────────────────┐
│ Determine that the pressure in the HVAC system does not         │
│ satisfy the pressure threshold                              408 │
└─────────────────────────────────────────────────────────────────┘
                                │
                                ▼
┌─────────────────────────────────────────────────────────────────┐
│ Determine to skip further adjustments to the actuator-          │
│ controlled damper or the fan speed of the HVAC system based     │
│ on a current value of the pressure                          410 │
└─────────────────────────────────────────────────────────────────┘
```

FIG. 4

HVAC SYSTEM ZONING PROTECTION

CROSS-REFERENCE TO RELATED APPLICATION

This application claims the benefit of U.S. Provisional Application No. 62/879,666, filed on Jul. 29, 2019, the contents of which are incorporated by reference herein.

TECHNICAL FIELD

This specification relates generally to HVAC zoning systems technology.

BACKGROUND

Heating, Ventilation, and Air Conditioning ("HVAC") systems are used to provide thermal comfort and acceptable indoor air quality to residential or commercial facilities. Typically, HVAC systems exchange or replace air in a space to remove unpleasant smells, control humidity, e.g., remove excessive moisture or add moisture, maintain air circulation and temperature, and prevent stagnation of interior air.

SUMMARY

In general, one innovative aspect of the subject matter described in this specification relates to monitoring an HVAC system, and can be embodied in methods that include the actions of receiving pressure data from one or more sensors monitoring a supply air duct of an HVAC system at a property that indicates a pressure in the HVAC system; determining, using the pressure data, that the pressure satisfies a pressure threshold for the HVAC system; and in response to determining that the pressure satisfies the pressure threshold, adjusting an actuator-controlled damper between the supply air duct and a return air duct or adjusting a fan speed of the HVAC system.

In general, one innovative aspect of the subject matter described in this specification relates to monitoring an HVAC system, and can be embodied in methods that include the actions of providing control information to an HVAC system that indicates a property for a control setting of the HVAC system; receiving data representing an error associated with a control setting of the HVAC system; in response to receiving the data representing the error associated with the HVAC system, generating an alert corresponding to the error associated with the HVAC system; and providing the alert corresponding to the error associated with the HVAC system to a device to cause the device to present information about the error.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include determining that the pressure does not satisfy the pressure threshold; and determining to skip further adjustments to the actuator-controlled damper or the fan speed of the HVAC system based on a current value of the pressure. Determining to skip further adjustments to the actuator-controlled damper or the fan speed of the HVAC system based on a current value of the pressure can be responsive to determining that the pressure has reduced below the pressure threshold. Receiving pressure data from one or more sensors monitoring the supply air duct of the HVAC system at the property can include receiving pressure data from one or more sensors monitoring the supply air duct and the return air duct of the HVAC system at the property.

In some implementations, adjusting the actuator-controlled damper between the supply air duct and the return air duct or adjusting the fan speed of the HVAC system can include adjusting a valve of the actuator-controlled damper between the supply air duct and the return air duct. Determining that the pressure satisfies the pressure threshold for the HVAC system can include determining that the pressure exceeds the pressure threshold for the HVAC system. Adjusting the valve of the actuator-controlled damper between the supply air duct and the return air duct can include at least partially opening the valve of the actuator-controlled damper between the supply air duct and the return air duct. Determining that the pressure satisfies the pressure threshold for the HVAC system can include determining that the pressure below the pressure threshold for the HVAC system. Adjusting the valve of the actuator-controlled damper between the supply air duct and the return air duct can include at least partially closing the valve of the actuator-controlled damper between the supply air duct and the return air duct.

In some implementations, determining that the pressure satisfies the pressure threshold for the HVAC system can include determining that the pressure exceeds the pressure threshold for the HVAC system. Adjusting the actuator-controlled damper between the supply air duct and the return air duct or adjusting the fan speed of the HVAC system can include reducing the fan speed of the HVAC system. Determining that the pressure satisfies the pressure threshold for the HVAC system can include determining that the pressure below the pressure threshold for the HVAC system. Adjusting the actuator-controlled damper between the supply air duct and the return air duct or adjusting the fan speed of the HVAC system can include increasing the fan speed of the HVAC system.

In some implementations, adjusting the actuator-controlled damper between the supply air duct and the return air duct or adjusting the fan speed of the HVAC system can include adjusting the actuator-controlled damper between the supply air duct and the return air duct and adjusting the fan speed of the HVAC system. Receiving the pressure data from the one or more sensors monitoring the supply air duct can include receiving the pressure data from the one or more sensors that monitor a portion of the supply air duct that provides air to one or more zones identified as zones to which the HVAC system currently should not provide forced air, the pressure data indicating the pressure for the portion of the supply air duct. Determining that the pressure satisfies the pressure threshold for the HVAC system can include determining that the pressure of the portion of the supply air duct that provides air to the one or more zones identified as zones to which the HVAC system currently should not provide forced air satisfies the pressure threshold.

In some implementations, receiving data representing the error associated with the control setting of the HVAC system can occur in response to providing control information to the HVAC system. Receiving data representing the error associated with the control setting of the HVAC system can include receiving sensor data that represents the error associated with the control setting of the HVAC system. Receiving the sensor data can include receiving the sensor data from a camera, a microphone, a motion sensor, a pressure sensor, or an airflow sensor.

The subject matter described in this specification can be implemented in various embodiments and may result in one or more of the following advantages. In some implementations, the HVAC systems described in this specification can run more efficiently, e.g., using less energy, than other HVAC systems. For instance, an HVAC system with different zones that have different temperatures can run more efficiently when a damper for one of the zones is closed. This can occur because the HVAC system's fan speed is reduced. In some examples, this can occur when the HVAC system directs air from a supply air duct to a return air duct, e.g., because the HVAC system does not need to clean the redirected air but may need to clean air brought into the return air duct from other parts of a property. In some implementations, the HVAC system described in this document can run more efficiently by increasing a fan speed, or at least partially closing a connection between a supply air duct and a return air duct when the HVAC system is not providing sufficient air to a zone, e.g., when the pressure of the air to the zone is below a threshold pressure.

In some implementations, the systems and methods described in this document can reduce HVAC system downtime by automatically detecting problems with the HVAC system, coordinating a solution to the problems, or both. In some implementations, the HVAC systems, or components of the HVAC systems, described in this specification can have a longer system life than other systems. For instance, an HVAC system can have less wear and tear caused by malfunctions in the system that are not readily detected by a user compared to other systems, resulting in a longer system life. HVAC systems that control air pressure can have a longer system life because they reduce unnecessary pressure on various components, such as a damper, a fan, or both, compared to other systems. In some implementations, the systems and methods described in this document can use data from multiple sensors at a monitored property to more quickly, more easily, or both, detect problems compared to other systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for generating an alert associated with an HVAC system.

FIG. 4 is a flowchart of an example process for adjusting dampers of an HVAC system.

DETAILED DESCRIPTION

Figure 1:
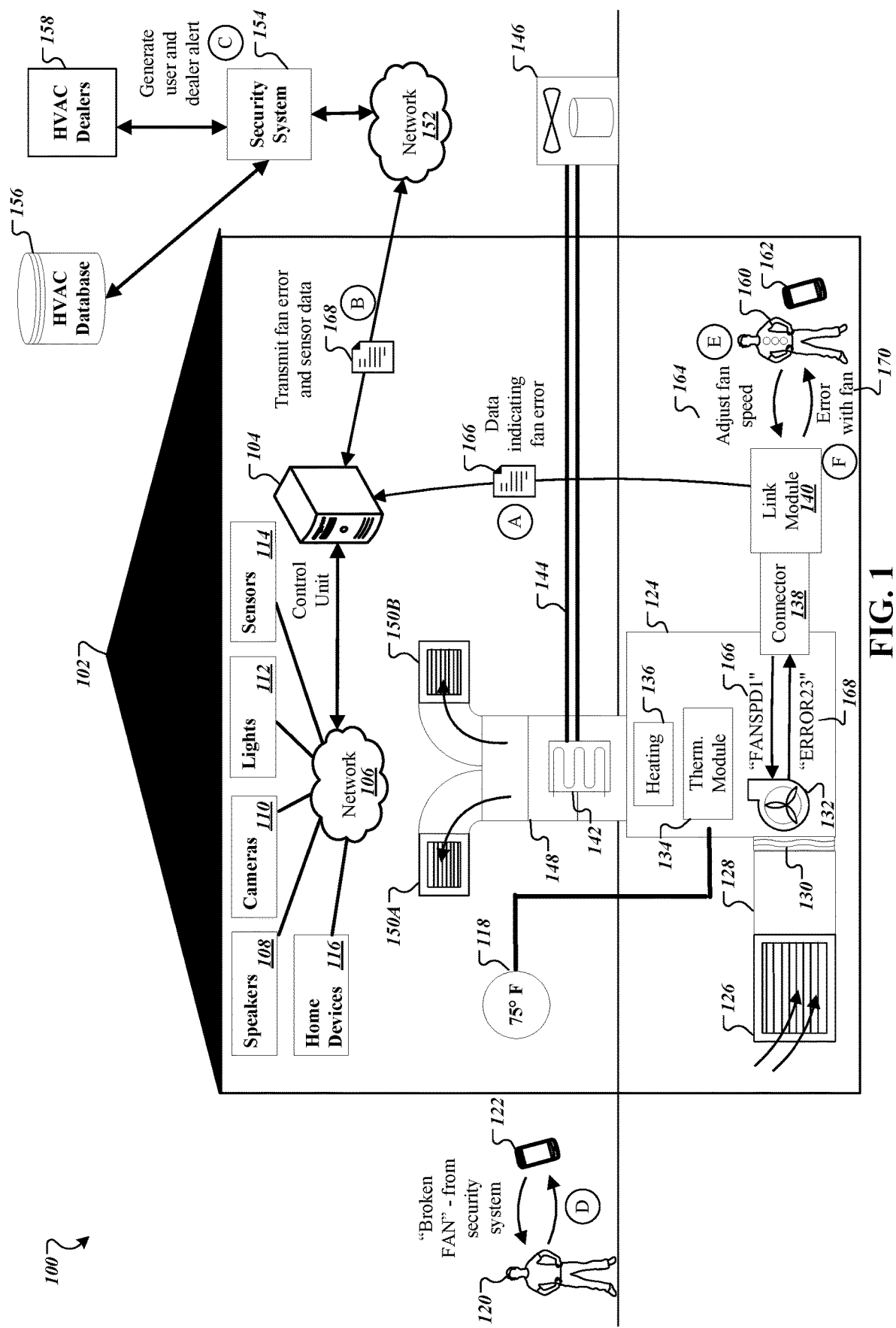
FIG. 1 is a contextual diagram of an example system for controlling components of an HVAC system.

The subject matter of the present disclosure is related to techniques for remotely monitoring and controlling a residential heating, ventilation, and air conditioning (HVAC) system. The HVAC system can connect to a link module that allows for remotely controlling the HVAC system. In particular, the link module connects to a residential HVAC system using a wired network protocol or a wireless network protocol. The link module facilitates two-way communication between the equipment of the HVAC system and a back-end security system monitoring the residential property. The link module includes various components for communicating with different components of the residential property. For example, the link module includes a transceiver, a radio module or wireless gateway, and a microprocessor. The transceiver communicates with the HVAC system at the residential property via local wired or wireless network. The radio module or wireless gateway transmits data from the HVAC system to the control unit server. In addition, the microprocessor collects the data received by the HVAC system and converts the data into various wireless protocols to transmit to the control unit server 104 or the security system.

In some implementations, the link module automatically forwards relevant data and error codes from the HVAC system to the server. The relevant data can include error data or confirmation data pertaining to controlling the settings of the HVAC system. If the HVAC system generates an alert, the link module can automatically trigger a real time alert to the customer and/or the security system. The alert can include error code information corresponding to the alert. In response to receiving the alert, the security system can contact the owner of the residential property, an HVAC service technician to service the residential property, or both.

In some examples, the link module can control settings of the HVAC system. In particular, an individual controlling the link module, such as an HVAC technician, a property owner, or an individual located at the security system, can provide commands to the link module to remotely control the settings and the operating state of the HVAC system. In some examples, the back-end security system and the control unit server can provide commands to the link module based on a set schedule or based on user preferences.

In some implementations, the subject matter of the present disclosure is related to monitoring zoned air systems in a residential property. In a typical zoned forced air system, individual branches off a main air duct supply are opened and closed using dampers to supply conditioned air to specific zones (e.g., rooms) in a home. For example, these rooms can include the kitchen, living room, foyer, and basement. The conventional forced air system is typically sized to output a fixed volume of air for a given volume of space and number of registers. Some forced air systems allow for at least two to three additional blower speeds. These blower speeds can be low speed, medium speed, or high speed. By providing varying speeds of the fan, the forced air systems can conserve energy on small temperature recoveries or increase for large temperature recoveries more quickly, e.g., when the forced air system is initially turned on. Higher-end forced air systems can be capable of more granularity in fan speed. For example, some higher-end forced air systems include fan speed modulation that is generated as a percentage of the max capable fan speed. Thus, fan speed can be increased or decreased as a percentage of the max fan speed.

In some implementations, an external zone control module that is separate from the HVAC system controls the individual zone dampers. The external zone control module controls the individual zone dampers in response to thermostat calls to adjust the temperature in the respective zones of the monitored property. However, the HVAC system of that monitored property might not have any knowledge that one or more zones of the monitored property have been closed off due to the closing of the corresponding dampers. As a result, the HVAC fan may produce more air than necessary and backpressure from the closed off zone branches can put stress on the system, waste energy, e.g., a large amount of energy, or both.

The HVAC system can reduce stress, energy waste, or both, e.g., by using a smart gateway that monitors pressure within the HVAC system at various points. In particular, the smart gateway can monitor pressure in the air ducts using pressure sensors and in response, decrease the fan speed when certain pressure thresholds are exceeded because of zone branches that are closed off. The smart gateway can decrease the fan speed by communicating with the HVAC system using the link module. The smart gateway can communicate with the HVAC system using a proprietary control language, e.g., for customizable HVAC systems. In some examples, an HVAC technician can install a bypass from the main system supply to the system return with an actuator-controlled damper to regulate the airflow. The smart gateway can monitor pressure using one or more sensors and modulate the bypass damper position using a connected smart actuator.

FIG. 1 is a contextual diagram of an example system 100 for controlling components of an HVAC system. Though system 100 is shown and described including a particular set of components including a control unit server 104, a network 106, speakers 108, camera 110, lights 112, sensors 114, home devices 116, air conditioner (or outdoor air compressor) 146, HVAC system 124, network 152, security system 154, HVAC database 156, and HVAC dealers 158, the present disclosure need not be so limited. For instance, in some implementations, the system 100 for monitoring the HVAC system 124 of the monitored property 102 may use only a subset of the aforementioned components. As an example, there may be implementations that do not use the speakers 108. Similarly, there may be implementations that the security system 154 is stored in the control unit server 104. The HVAC database 156 may also be stored within the monitored property 102. Yet, other alternative exemplary systems also fall within the scope of the present disclosure such as a system that does not use a control unit server 104, but rather, relies solely on the security system 154 for monitoring purposes. For these reasons, the system 100 should not be viewed as limiting the present disclosure to any particular set of necessary components.

As shown in FIG. 1, a monitored property 102 owned by property owner 120 is monitored by a control unit server 104 that includes components within the monitored property 102. The system 100 further includes an alarm panel for displaying security messages, a thermostat 118, and an HVAC system 124. The HVAC system 124 includes a return air duct 126, an air duct 128, an air filter 130, a fan 132, a thermostat module 134, a heating module 136, an evaporator coil 142, an air compressor 146, refrigerant filled tubing 144, and supply air ducts 150A and 150B. The thermostat 118 displays a temperature to set the temperature of the monitored property 102. In some implementations, the monitored property 102 may include multiple thermostats. A thermostat can be included in each room, each level, each zone, or a combination of these, of the monitored property 102. The zone can include one or more areas controlled by a particular air duct, e.g., supply air duct 150A, from the HVAC system 124.

The return air duct 126 includes a duct of air to carry air from a conditioned air space, such as a living room, in the monitored property 102 to the air duct 128. This recycled air can be passed through the HVAC system 124, reconditioned, and blown back to the areas of the monitored property. The air filter 130 can include a porous device that can be used to remove impurities or solid particles from the air provided by the return air duct 126 that passes through the air filter 130. The fan 132 can include a mechanical device that creates a current of air, such as with the use of rotational blades, to move air throughout the HVAC system 124 and into the monitored property 102. The fan 132 blows air through the supply air ducts 150A and 150B.

The thermostat module 134 is a device within the HVAC system 124 used to receive commands from the thermostat 118. Additionally, the thermostat module 134 can convert commands into instructions. For example, the thermostat module 134 can use the commands to generate instructions that instruct the HVAC system 124 to adjust the temperature of monitored property 102 to a set temperature set by the thermostat 118. The commands can be commands based on user input. For instance, a property owner 120 may set the temperature of the thermostat 118 with his client device 122 or by directly interacting with the thermostat 118. The setting of the temperature can generate one or more commands that the thermostat module 134 uses to generate one or more corresponding instructions.

The heating module 136 produces heat to provide to the monitored property 102 through the HVAC system 124. The evaporator coil 142 sits on top of the heating module 136 and can be used to heat or cool air inside the monitored property 102. For example, the heating module 136 can warm the air provided by the fan 132 and can provide the warm air to move over the evaporator coil 142. The air returned from the return air duct 126 is pulled through the air duct 128 as the fan 132 blows, and the fan 132 pushes the air through the heating module 136. The air temperature can cool or warm up (depending on the temperature set by the thermostat 118) as the air passes over the evaporator coil 142. If the temperature of the thermostat 118 is set lower than the air temperature, then the heating module 136 cools the air because heat from the air transfers to the refrigerant in the refrigerant filled tubing 144. The refrigerant filled tubing 144 circulates refrigerant between the outdoor compressor 146 and the evaporator coil 142. Other designs within the HVAC system 124 are possible.

The outdoor compressor (e.g., air compressor) 146 removes heat from the refrigerant, supplies air or other gas at increased pressure to the HVAC system 124, and includes a fan, which is used to create a current of air. The air handling unit 148 includes a device to condition and circulate air to the monitored property 102 as part of the heating, ventilating, and air-conditioning process for the HVAC system 124. The supply air ducts 150A and 150B can provide resultant air from the HVAC system 124 to particular rooms, zones, and/or areas throughout the monitored property 102.

In some implementations, the components within the monitored property 102 may include one or more speakers 108, one or more cameras 110, one or more lights 112, one or more sensors 114, and one or more home devices 116. The one or more cameras 110 may include video cameras that are located at the interior of the monitored property 102 near the front, rear, or garage doors. For example, a video camera may be placed in the basement of the monitored property 102 for visually monitoring the HVAC system 124 and transmit the recorded media (e.g., live or post recording) to the control unit server 104 or the security system 154 to notify the property owner 120 through the client device 122.

The one or more sensors 114 can include motion sensors located at the exterior of the monitored property 102, a front door sensor that is a contact sensors positioned at the front door, a pressure sensor that receives button presses at a light device, an airflow sensor included in the air duct 128 or the air handling unit 148, one or more pressure sensors located throughout the HVAC system 124, a lock that is positioned at the front door and each window within the monitored property 102, a microphone positions in the monitored property 102, e.g., as part of a smart device, or a combination of these. The contact sensor may sense whether a door or a window is in an open or closed position. The lock sensor may sense whether a door or a window is in an unlocked or locked position. The airflow sensor may sense whether air is flowing through the HVAC system 124 when powered on to either heat or cool the monitored property 102. Additionally, the airflow sensor may be able to provide the rate of flow through the HVAC system 124 and the quality of the air, e.g., humidity rate, dryness, etc. In some examples, the HVAC system 124 can include one or more pressure sensors in the supply air ducts 150A and 150B to determine whether any pressure builds up from closed off air ducts. The one or more sensors 114 may include a humidity sensor that monitors an amount of humidity found throughout the monitored property 102.

The one or more home devices 116 found in the monitored property 102 may include home appliances such as a washing machine, a dryer, a dishwasher, an oven, a stove, a microwave, and a laptop, to name a few examples. The devices 116 can additionally include smart window shades that adjust how much light to block or let in the monitored property 102. If the monitored property 102 is a commercial facility, the one or more home devices 116 can include a printer, a copier, a vending machine, and a fax machine to name a few examples.

The control unit server 104 can communicate over network 106 using a wired or wireless connection. The control unit server 104 can communicate with the connected devices in the monitored property 102, such as the one or more speakers 108, one or more cameras 110, one or more lights 112, one or more sensors 114, and one or more home devices 116 (e.g., washing machine, a dryer, a dishwasher, an oven, a stove, a microwave, a laptop, etc.) to receive sensor data description of events detected by the components of the monitored property 102. For example, the components include the one or more speakers 108, the one or more cameras 110, the one or more lights 112, the one or more sensors 114, and the one or more home devices 116 in the monitored property 102.

In some implementations, each of the connected devices in the monitored property 102 may connect via Wi-Fi, Bluetooth, or any other protocol used to communicate over network 106 to the control unit server 104. In some implementations, the one or more speakers 108, the one or more cameras 110, the one or more lights 112, the one or more sensors 114, and the one or more home devices 116 can communicate with the security system 154 over the network 152 and bypass the control unit server 104. Additionally, the control unit server 104 can communicate over a long-range wired or wireless connection with a security system 154 over the network 152.

In some implementations, the security system 154 is located remotely from the monitored property 102. In other implementations, the security system 154 can be located locally at the monitored property 102 within the control unit server 104. The security system 154 communicates bi-directionally with the control unit server 104. Specifically, the security system 154 receives sensor data descriptive of events detected by the sensors included in the monitoring system of the monitored property 102. Additionally, the security system 154 can transmit instructions to the control unit server 104 for particular events. The control unit server 104 and the security system 154 can also communicate directly with HVAC dealers 158 and the HVAC database 156.

The security system 154 can monitor the monitored property 102, as well as other (and perhaps, many more properties), monitoring systems located at different monitored properties that are owned by various property owners. For example, the security system 154 can monitor many monitored properties by zip code, country, or city. In other implementations, the security system 154 can monitor monitored properties within a particular neighborhood or across multiple neighborhoods.

The security system 154 can communicate with an HVAC database 156. The HVAC database 156 can include one or more tables relatable to data corresponding to various HVAC system monitored by the security system 154. The one or more tables can include data describing issues of HVAC systems, failure data corresponding to the HVAC systems, data corresponding to HVAC systems that have changed from an issue state to a healthy state, and data corresponding to HVAC system that have changed from a healthy state to an issue state. Additionally, the one or more tables can include error codes corresponding to issues with the HVAC systems and past error codes provided by the HVAC systems. The tables can additionally store sensor data from a corresponding monitored property for each of the aforementioned HVAC system issues. The tables can store classification label data corresponding to types of issues generated by the security system 154. For example, these issues can correspond to broken components, such as, broken thermostat, unresponsive burners, unresponsive air compressors, e.g., an unresponsive air compressor 146, lack of refrigerant in the refrigerant filled tubing 144, a broken fan 132, a broken evaporator coil 142, or a combination of two or more of these.

The tables can store data that indicates issues corresponding to the link module 140 and the HVAC system 124. In particular, the link module 140 may provide a command to one or more components of the HVAC system 124 to set control information of the HVAC system 124. For example, the command may include setting a particular speed for the fan 132, a particular temperature for the thermostat 118, and the temperature to set the evaporator coils 142. If the HVAC system 124 is able to set the parameter for the component corresponding to the command, the component can provide a confirmation status back to the link module 140. Alternatively, if the HVAC system 124 is not able to set the parameter for the component corresponding to the command, the component can provide back an error message to the link module 140. This can occur when the component that corresponds to the command is offline, e.g., does not have power or is off, or when the component is unable to perform an action that corresponds to the command. Thus, the tables can store the command provided by the link module and the status response provided by the component of the HVAC system 124.

In some examples, the HVAC database 156 can also store indication when these issues have been fixed. These indications can include sensor information that indicates the HVAC technician has fixed the issues, notifications from property owner 120 that indicate that the HVAC technician is scheduled to work on the issue, contact information corresponding to the property owners of the monitored property, contact information corresponding to the HVAC technicians to fix the issues, a record log of data showing the security system 154 contacting the HVAC dealers 158 and the property owner 120, or a combination of two or more of these.

The HVAC database 156 can store raw sensor data corresponding to the monitored properties when and where these issues occur. For example, the raw sensor data include motion detector data, proximity data, thermal data, and data from the components of the monitored property, when one of these issues are detected by the control unit server 104. The HVAC database 156 can receive this data corresponding to HVAC issues from the control unit server 104 at the monitored property 102 and other monitored properties with an HVAC system.

The HVAC database 163 can receive thermostat data from a thermostat at the monitored property, such as thermostat 118 from monitored property 102. The HVAC database 163 can also receive data from multiple thermostats at a particular monitored property 102. For example, the thermostat information may comprise a current temperature, an operating state of the thermostat, information based on changes of operating state of the thermostat, such as when the thermostat is instructed to turn on and turn off. The thermostat information can include set points of the thermostat indicating target temperature, outdoor temperature, or both, at the time of a broken HVAC system. The thermostat information can indicate whether the auxiliary heat is included in the monitored property 102. The thermostat information can include humidity information provided by the HVAC system 124, a power usage associated with the HVAC system 124, various temperature readings from around different zones of the monitored property 102, or a combination of two or more of these.

The control unit server 104 can tag the thermostat information before providing the thermostat information to the security system 154 from the thermostat 118, e.g., for updating the HVAC database 156. For example, the tags can indicate whether the data from the thermostat corresponding to an HVAC system in an unhealthy state, a healthy state, a maintenance operation state, an off state, or a combination of these. This can enable the HVAC database 156 to store the raw sensor data and corresponding thermostat data appropriately.

The HVAC database 156 can store outdoor temperature data (e.g., humidity, temperature, and precipitation) corresponding to a particular monitored property. As a result, the HVAC database 156 can store temperature data, such as indoor temperature data, outdoor temperature data, and humidity information corresponding to the monitored property 102. The temperature data can be provided to the HVAC database 156 and stored when the HVAC system 124 is in an unhealthy state, a healthy state, a maintenance state, an off state, as the system transitions from an unhealthy state to the healthy state, as the system transitions from the healthy state to the unhealthy state, or a combination of two or more of these. One or more HVAC dealers 158 when performing maintenance on a particular HVAC system for a monitored property 102 can retrieve the data stored in the HVAC database 156.

In some implementations, the property owner 120 may communicate with the client device 122 to activate a signature profile for the monitored property 102. To illustrate, the property owner 120 may first instruct the control unit server 104 to set a signature profile for arming the monitored property 102. For example, property owner 120 may use a voice command to say "Smart Home, Arm Home." The voice command may include a phrase, such as "Smart Home" to trigger the client device 122 to actively listen to a command following the phrase. The phrase "Smart Home" may be a predefined user configured term to communicate with the client device 122. The client device 122 can send the voice command to the control unit server 104 over the network 106, analyze the voice command locally, or a combination of both. The control unit server 104 or the client device 122 may notify the security system 154 that the monitored property 102 is to be armed. In addition, the control unit server 104 may set parameters to arm the monitored property 102 in response to receiving the voice command or data that indicates the voice command. Moreover, the control unit server 104 can send back a confirmation to the client device 122 in response to arming the monitored property 102 and setting the armed parameters. For example, the control unit server 104 may send back a response to display a message on the client device 122 or the alarm panel in the monitored property 102 that says "home armed."

The importance of setting the signature profile indicates to the control unit server 104 who to contact in case of an issue with one or more components of the HVAC system 124. For example, once the armed home signature profile is set, the control unit server 104 can send, e.g., immediately or within a threshold period of time, a notification to the client device 122 of the property owner 120. The notification can instruct the client device 122 to display a message to the property owner 120 that the monitored property 102 is armed. If the link module 140 connected to the HVAC system 124 receives an error code or alert from the HVAC system 124, the link module 140 will trigger an alert and transmit the error code along with data identifying the HVAC system 124 to the control unit server 104. In response, the control unit server 104 can take steps to notify the property owner 120 of the error. In particular, the control unit server 104 can provide a notification of the error to the property owner 120 via the client device 122. The control unit server 104 can provide the error code along with sensor data from the monitored property to the security system 154. The security system 154 can decipher the error code to alert one or more HVAC dealers 158 to be dispatched to the monitored property 102 to fix the HVAC system 124. In some implementations, if the armed home signature profile is not set, the control unit server 104 may only notify the property owner 120 without contacting the security system 154, one or more HVAC dealers, or both. In some examples, the control unit server 104 may only notify the security system 154 if the armed home signature profile is set.

In some implementations, in response to the link module 140 triggering alert regarding the error of the HVAC system 124, the control unit server 104, the security system 154, or both, can log the alert of the HVAC system 124 along with a timestamp in memory. Thus, a user, such as the property owner 120 or an HVAC technician 160, can review the logs at a later point in time to review the issue with the HVAC system 124.

The link module 140 can connect to the HVAC system 124 through the connector 138. The connector 138 can be a wired or wireless connection. For example, the connector 138 can include a serial connection or serial port, such as a PCI Express port, RS-232 port, RS-485 port, or a USB port. The link module 140 facilitates two-way communication between HVAC equipment and the security system 154. Additionally, the connector 138 can include a wireless connection, such as a Bluetooth connection, a Wi-Fi connection, or a ZigBee connection. The link module 140 can connect to the connector 138 using one of these connections.

In some implementations, the data extracted from the HVAC system 124 to the link module 140 can correspond to each of the components of the HVAC system 124. In particular, the link module 140 can extract error codes, diagnostic information, and operating information corresponding to the components of the HVAC system 124. Additionally, the link module 140 can extract data corresponding to the HVAC system 124 as a whole. For example, the link module 140 can extract power information and amount of forced air produced by the HVAC system 124. The link module 140 can then transmit the data to the control unit server 104 or the security system 154. In some implementations, the link module 140 can receive data from the HVAC system 124 in real-time and in response, transmit the data to the control unit server 104. In some examples, the link module 140 may request data from the HVAC system 124, e.g., based on a schedule. In response to the request, the HVAC system 124 can provide data corresponding to the request to the link module 140.

The link module 140 allows a user to set parameters of various components of the HVAC system 124. In particular, a user, such as HVAC technician 160, can provide settings information to each of the components of the HVAC system 124. For example, the HVAC technician 160 can set the speed of fan 132, temperature of the thermostat 118, temperature of the heating module 136, and the temperature of the evaporator coils 142. Additionally, the link module 140 can communicate with HVAC components outside the monitored property 102, such as an outdoor thermometer and an outdoor air compressor, to request status information corresponding to these components. The link module 140 can set parameters corresponding to the outdoor components. In response to setting parameters corresponding to components of the HVAC system 124 through the link module 140, the components can provide status information back through the link module 140. The link module 140 can provide status information corresponding to the components of the HVAC system 124 to the client device 162 of the HVAC technician 160.

In some implementations, the link module 140 can transmit the data extracted from the HVAC system 124 to the control unit server 104. The control unit server 104 proceeds to classify the data received from the link module 140. For example, the classification of the data can be a particular label that describes the data from the link module 140. Similarly, the security system 154 can classify the output in a similar manner to the control unit server 104. For example, the classification can be a code, a textual description, a category, a sub-category, or a number that represents a type of the output of the HVAC system 124. The classification can describe the output that represents status corresponding to the HVAC system 124. For example, if the HVAC system 124 provides an error code corresponding to the components of the HVAC system 124, the control unit server 104 can classify the error code as a heating issue, a cooling issue, a filter issue, a broken component corresponding to each of the one or more contents, such as a blocking of the air duct 128, a blocking of the supply air ducts 150A or 150B or both, a build-up of pressure within the air ducts, an old air filter 130, a broken fan 132, or a lack of refrigerant found in the refrigerant filled tubing 144. Other issues can correspond to the components of the HVAC system 124; the above-mentioned are illustrated as examples.

In some implementations, if the HVAC system 124 provides operating information corresponding to its components, the link module 140 can transmit the operating information to the control unit server 104. The control unit server 104 can classify the operating information. For example, the operating information can indicate operating speeds of fan 132, typical temperatures provided by the thermostat 118, a heating temperature of the heating module 136, typical temperatures of the refrigerant filled tubing 144, frequency of use of the air compressor 146, or a combination of two or more of these. The control unit server 104 can provide this error code and corresponding classification to the security system 154 over network 152. The security system 154 can store this received data in the HVAC database 156.

In response to the control unit server 104 or the security system 154 generating and storing the classification label corresponding to the output provided by the link module 140, the security system 154 may communicate with the HVAC dealers 158 based on the type of the classification. The security system 154 can monitor many properties in a particular area and can communicate with HVAC dealers 158 to dispatch one or more HVAC technicians to a monitored property. If the classification label indicates to the security system 154 an error associated with the HVAC system 124, the security system 154 can take corrective action to fix this issue. For example, the security system 154 can process the received classification of the issue from the link module 140 to determine that a fan is broken, for example. In response to determining that the fan 132 corresponding to the HVAC system 124 of the monitored property 102 is broken, the security system 154 can immediately take action to contact the property owner 120 of the monitored property to verify that individuals located at the monitored property 102 are safe and to determine if emergency services are needed. In particular, the security system 154 can relay a message to the client device 122 to let the property owner 120 know of a detected issue (e.g., issue with the fan 132) with the property owner 120's HVAC system 124.

In the message to the client device 122, the security system 154 can request if the property owner 120 requires that an HVAC technician 160 be dispatched to the monitored property 102 to review the issue corresponding to the HVAC system 124. The property owner 120 can respond to the message provided by the security system 154 by speaking or entering a key on the keypad through his/her client device 122. If the property owner 120 responds "No," then the client device 122 provides "No" back to the security system 154, and the security system 154 can store an indication of contacting the property owner 120 of the detected issue with the HVAC system 124. Alternatively, if the property owner 120 responds "Yes," then the security system 154 can indicate to the property owner 120 that an HVAC technician will be coming to the monitored property 102 to fix the detected issue corresponding to the HVAC system 124. In response, the security system 154 can communicate with the HVAC dealers 158 to dispatch one or more HVAC technicians to the address of the monitored property 102. The security system 154 can transmit directions of the address of the monitored property 102 to the client device 162 of the HVAC technician 160. For example, the security system 154 can instruct the HVAC dealers 158 to dispatch the HVAC technician 160 to the monitored property 102.

For example, during stage (A), the property owner 120 can set the parameters for the "arming home" signature profile that includes setting the configuration for the control unit server 104 to monitor the HVAC system 124. In some implementations, the control unit server 104, the corresponding sensors, and the home devices constantly monitor the HVAC system 124. In particular, the control unit server 104 can retrieve data at a particular interval throughout a predetermined time from the HVAC system 124, the speakers 108, the cameras 110, the lights 112, the sensors 114, the thermostat 118, and the home devices 116.

The control unit server 104 can poll each of these devices in the monitored property 102 every hour, every 24 hours, or once a week, to name a few examples. The property owner 120 or an administrator, e.g., for the security system 154, can set the period with which the control unit server 104 polls these devices. In response to receiving the data from each of these devices, the control unit server 104 can use this data to transmit to the security system 154 along with the indication from the link module 140 regarding the status of the HVAC system 124. By providing the status of the HVAC system 124 to the security system 154 along with the data from the sensors of the monitored property 102, the control unit server 104 and the security system 154 can properly classify the status of the HVAC system 124. The data from the sensors can include raw sensor data, thermostat data, and identification data corresponding to the monitored property.

The control unit server 104 can transmit messages to the HVAC system 124 through the link module 140. In some implementations, the messages from the control unit server 104 can indicate to change one or more parameters of the HVAC system 124. For example, the messages can indicate to change the speed of fan 132, change the temperature of the thermostat 118, change the ramp speed of the fan 132, or change other parameters. The link module 140 can receive the message from the control unit server 104 and provide the received message in a format understood by the component of the HVAC system 124 to the desired component of the HVAC system 124. The control unit server 104 may transmit the message based on a change in temperature or airflow by the property owner 120, by the HVAC technician 160, by a user located at the security system 154, or based on a set schedule designated by the property owner 120.

The link module 140 can use any appropriate process to convert received messages, or the commands included in the messages, into a format understood by a corresponding component of the HVAC system 124. For instance, the link module 140 can use an application programming interface ("API") and determine, for a particular command, a corresponding API call for the corresponding HVAC component. In some examples, the link module 140 can include a table that maps commands to HVAC component instructions.

In some implementations, the link module 140 can automatically provide data to the control unit server 104. For example, if the HVAC system 124 determines that one of its components fails or equipment is in poor condition, the HVAC system 124 may automatically generate an error message to provide to the link module 140 through the connector 138. The HVAC system 124 may automatically produce status messages at a predetermined rate. The status messages can be provided out of the connector 138 to a device, such as the link module 140. In response to the link module 140 receiving the status message from the HVAC system 124, the link module 140 can transmit the status message 166, or data from the status message 166, to the control unit server 104. The status message 166 can include data indicating the error corresponding to the HVAC system 124, an identifier for the HVAC system 124, an identifier for the link module 140, or a combination of two or more of these. The link module 140 can provide the status message 166 to the control unit server 104 over the network 106 or to the security system 154 over the network 152.

In other implementations, in response to the link module 140 receiving messages and notifications from the control unit server 104, a client device, or a user interacting with the link module 140 for setting parameters associated with the HVAC system 124, the link module 140 provides the message or notification to the particular component of the HVAC system 124 in a manner suitable for the particular component to understand. In response, the component may provide an error message or a confirmation message that the setting did not change due to an error or the setting did in fact change, respectively. The link module 140 can then provide the error message or confirmation message back to the control unit server 104.

During stage (B), the control unit server 104 transmits the data from link module 140 and data from devices in the monitored property 102 as message 168 to the security system 154. The data from the devices in the monitored property 102 can include the data from the sensors 114 and the cameras 110 that monitor the HVAC system 124, to name a few examples. For instance, the control unit server 104 may retrieve recorded media from the cameras 110 that monitor the HVAC system 124 and data from pressure sensors, motion sensors, and heat sensors surrounding or within the HVAC system 124. The control unit server 104 and/or the security system 154 can use this data, potentially with other data, to classify the error produced by the HVAC system 124. The security system 154 receives the message 168 from the control unit server 104 over the network 152.

During stage (C), the security system 154 receives the data from the control unit server 104. The security system 154 can perform an automated action based on the data, such as generating a user alert, a dealer alert, or both, based on the status within the message 168. In some examples, the security system 154 can automatically order parts for the HVAC system 124, e.g., for a malfunctioning component. For example, the security system 154 analyzes the status of the HVAC system 124 to determine whether an issue exists with the HVAC system 124. The security system 154 classifies the status of the HVAC system 124. The classification can include a particular label or description that describes the status. For example, the classification of the status can include an indication of a broken component within the HVAC system 124, such as "FURNACE" or "FAN"; a textual description that describes the status, such as "Broken Furnace," "Broken Fan," or "Old air filter." The classification can indicate a category with which the status message falls under, such as "broken component," "inefficient component," or a number that represents a type of error, such as "012345" that represents a thermometer without battery. The security system can generate multiple classifications corresponding to the status within the message 168, where the multiple classifications include a code, a textual description, and a number, for example. Other example combinations are possible.

In some implementations, the security system 154 can execute analytics on the data captured from the sensors 114, data from other components at the monitored property 102, the error code provided by the HVAC system 124, or a combination of these. In particular, the security system 154 can provide the data to a trained machine-learning model to produce an indication of a classification of the error or predict failure modes corresponding to the HVAC system 124. The security system 154 can additionally provide historical sensor data from the monitored property 102 or other properties monitored by the security system 154 to the trained machine-learning model to produce the classification of the error or predicted failure modes corresponding to the HVAC system 124. The security system 154 can train the machine-learning model on previously determined failure modes, corresponding sensor data, and user provided data at the corresponding monitored property 102.

In some implementations, the security system 154 can take corrective action if the classification label generated by the security system 154 indicates that an issue with the HVAC system 124. In particular, if the classification label indicates of an error associated with the HVAC system 124, the security system 154 can contact the HVAC dealers 158 to dispatch an HVAC technician 160 to the monitored property 102, automatically order or ensure inventory of parts for the HVAC system 124, or both. For example, the security system 154 can determine that the supply air ducts 150A and 150B are blocked and not able to provide warm air to the monitored property 102. In another example, the security system 154 can determine that the heating module 136 is not warming the monitored property 102 to the desired temperature set by the thermostat 118.

In response to the errors determined by the security system 154, the security system 154 can notify the property owner 120 of the error with the HVAC system 124. The property owner 120 may be unaware of the issue with the HVAC system 124, e.g., when the property owner 120 is out of town or at work. The security system 154 can transmit the generated classification and the data from the message 168 to store in the HVAC database 156 for later retrieval. The security system 154 can later retrieve this data from the HVAC database 156 for comparing to future potential issues with the HVAC system 124 and other HVAC systems at other corresponding monitored properties 102.

During stage (D), the security system 154 can transmit a notification to the client device 122 indicating of the error with the HVAC system 124. For example, the notification can recite "Broken fan in the HVAC system." Alternatively, the security system 154 can call the client device 122 and leave a voice recording, or otherwise send a voice recording to the client device 122, that indicates the fan error exists with his/her HVAC system 124. The security system 154 may ask the property owner 120 to determine whether an issue exists with one or more components of his/her HVAC system 124. The security system 154 can additionally ask the property owner 120 whether an HVAC technician, such as HVAC technician 160, should be dispatched to the monitored property 102 to fix the issue with the HVAC system 124.

In response, the property owner 120 can interact with his/her client device 122 to provide a response to the security system 154. For example, the property owner 120 can speak to the client device 122 or interact with the keys or screen of the client device 122 to provide a response. The property owner 120 may open an application on the client device 122, such as a smart home application to communicate with the user or computer located at the security system 154. In some implementations, the property owner 120 can decline the request provided by the security system 154. In some implementations, the property owner 120 can respond to the request provided by the security system 154 by indicating "Yes" through the client device 122 so the security system 154 can instruct the HVAC dealers 158 to dispatch a technician to fix the issue with the HVAC system 124.

The security system 154 can receive the response from the property owner 120 and proceed based on the response received. For instance, the security system 154 can communicate with the HVAC dealers 158. In particular, the response can indicate if the property owner 120 is safe, whether the property owner 120 notices an issue with his/her HVAC system 124, whether the property owner 120 wishes to have an HVAC technician, such as HVAC technician 160, dispatched to the monitored property 102, or a combination of these. If the security system 154 receives an indication that the property owner 120 does not notice an issue with his/her HVAC system 124, the security system 154 can proceed to contact the HVAC dealers 158 to dispatch an HVAC technician 160 to the monitored property 102.

If the property owner 120 does not wish to have an HVAC technician 160 dispatched to his/her monitored property 102, the security system 154 can discard the response from the property owner 120, store the data received in the message 168 in the HVAC database 15 for later retrieval, or both. This data in the HVAC database 156 can be used to analyze other issues that may exists with HVAC systems.

If the property owner 120 wishes to have an HVAC technician dispatched to the property owner's 120 monitored property 102, then the security system 154 can instruct an HVAC technician at the HVAC dealers 158 to be dispatched. The security system 154 can provide driving directions to the client device 162 of the HVAC technician 160, data identifying the issue corresponding to the HVAC system 124 that requires service, information about the way in which the HVAC technician 160 can fix the HVAC system 124, or a combination of these. For example, the data identifying the issue can include the error 168 generated by the HVAC system 124, the classification of the issue generated by the security system 154, a description of issues provided by the property owner 120 when the property owner 120 communicated with the security system 154, or a combination of these.

During stage (E), the HVAC technician 160 can interact with the HVAC system 124 to correct the issue with the HVAC system 124. In particular, the HVAC technician 160 can provide settings data to the HVAC system 124 through the link module 140. For example, the HVAC technician 160 can use the link module 140 to set parameters associated with the HVAC system 124, such as the speed of the fan 132, the humidity of the air passed through the HVAC system 124, the amount of time in which the furnace in the HVAC system 124 ramp up, ramp down, how long the furnaces heat, and what temperature the furnace is set to.

In some implementations, the HVAC technician 160 can remotely communicate with the link module 140 using his/her client device 162. The HVAC technician 160 can provide one or more control settings 164 to the link module 140 to set various parameters of the HVAC system 124. For example, as illustrated in system 100, the HVAC technician 160 can provide a setting 164 to adjust the speed of fan 132. The HVAC technician 160 can set the speed of the fan 132 to be low. For instance, this can enable the HVAC technician 160 to determine if the issue still exists with the fan 132.

In some implementations, the link module 140 can convert the setting 164 command to a protocol understood by the HVAC system 124. For example, the link module 140 converts the one or more control settings 164 to a "FANSPD1" message 166 understood by the HVAC system 124. The link module 140 can convert each control setting to one or more messages formatted for the HVAC system 124. In some examples, the link module 140 can convert multiple control settings into a single message formatted for the HVAC system 124.

In particular, the link module 140 can convert the one or more control settings 164 to a protocol understood by a particular component of the HVAC system 124. Each component of the HVAC system 124 may communicate using a different protocol. Each HVAC system may communicate with the link module 140 using different communication protocols. The link module 140 can be programmed to understand each of the protocols from the various HVAC systems and the various HVAC components in order to provide meaningful information to the control unit server 104. In some implementations, the link module 140 may include pre-compiled libraries corresponding to a particular HVAC system and its components. The pre-compiled libraries on the link module 140 can enable the link module 140 to facilitate delivery of information between the HVAC system and the link module 140. Other software on the link module 140 can enable the link module 140 to decode and understand the diagnostic codes coming from the HVAC system and its components. Thus, the diagnostic code returned by the HVAC system can specifically identify an issue corresponding to the component of the HVAC system. This can improve granularity of reporting of HVAC systems based on the combination of analytics and error codes.

During stage (F), in response to the link module 140 providing a setting 164 command to the fan 132 to lower the fan speed, the fan 132 can provide a confirmation (message) 168 back to the link module 140 that indicates whether the fan 132 was able to change a setting based on the one or more control settings 164. The confirmation (message) 168 can indicate that the one or more control setting 164 changes did not take place. For example, the confirmation (message) 168, as illustrated in system 100, indicates "ERROR23." ERROR23 can indicate that an error exists with the fan 132 and that the fan speed was not adjusted, as instructed by the setting 164. Thus, the HVAC technician 160 knows that an issue exists with the fan 132.

The components of the HVAC system 124 may provide different statuses to the link module 140. For example, the statuses can include "CONFIRMED," to indicate that the one or more control setting 164 changes have indeed taken place or another error message corresponding to the component of the HVAC system 124. In some implementations, the message 168 can indicate both an error and a confirmation, e.g., when some of the one or more control settings 164 were changed while others were not. The error messages can provide the HVAC technician 160 with a description of the error with the HVAC system 124.

One goal of using the link module 140 in connection with the HVAC system 124 is to keep the HVAC system 124 running at optimal efficiency. In particular, the link module 140 enables the HVAC system 124 to operate with the use of thermometers dispersed throughout rooms of the monitored property 102. For instance, the link module 140 can enable the HVAC system 124 to use data from one or more remote thermometers or other temperature sensors, e.g., two or more remote thermometers, as its system input control. Thus, the HVAC system 124 becomes intelligent. Critical pieces of feedback from other components in the monitored property 102 can be provided to the link module 140 to communicate with the furnace of the HVAC system 124. Essentially, temperature sensors found around the monitored property 102 can communicate with the HVAC system 124 through the link module 140. For example, users located at the monitored property 102 or remotely from the monitored property 102 can provide parameters to the link module 140, such as specific temperatures, fan speeds, and adjustments to airflow in each of the air ducts. In one use case, a property owner 120 can contact someone at the security system 154 or interact through his/her client device 122 to indicate that his monitored property 102 is not as comfortable as desired. A technician located at the security system 154 can change the settings of the HVAC system 124 remotely to increase or decrease the number of cubic feet of air that is pushed through the ventilation of the HVAC system 124. Thus, this setting can be controlled remotely and locally.

Figure 2A:
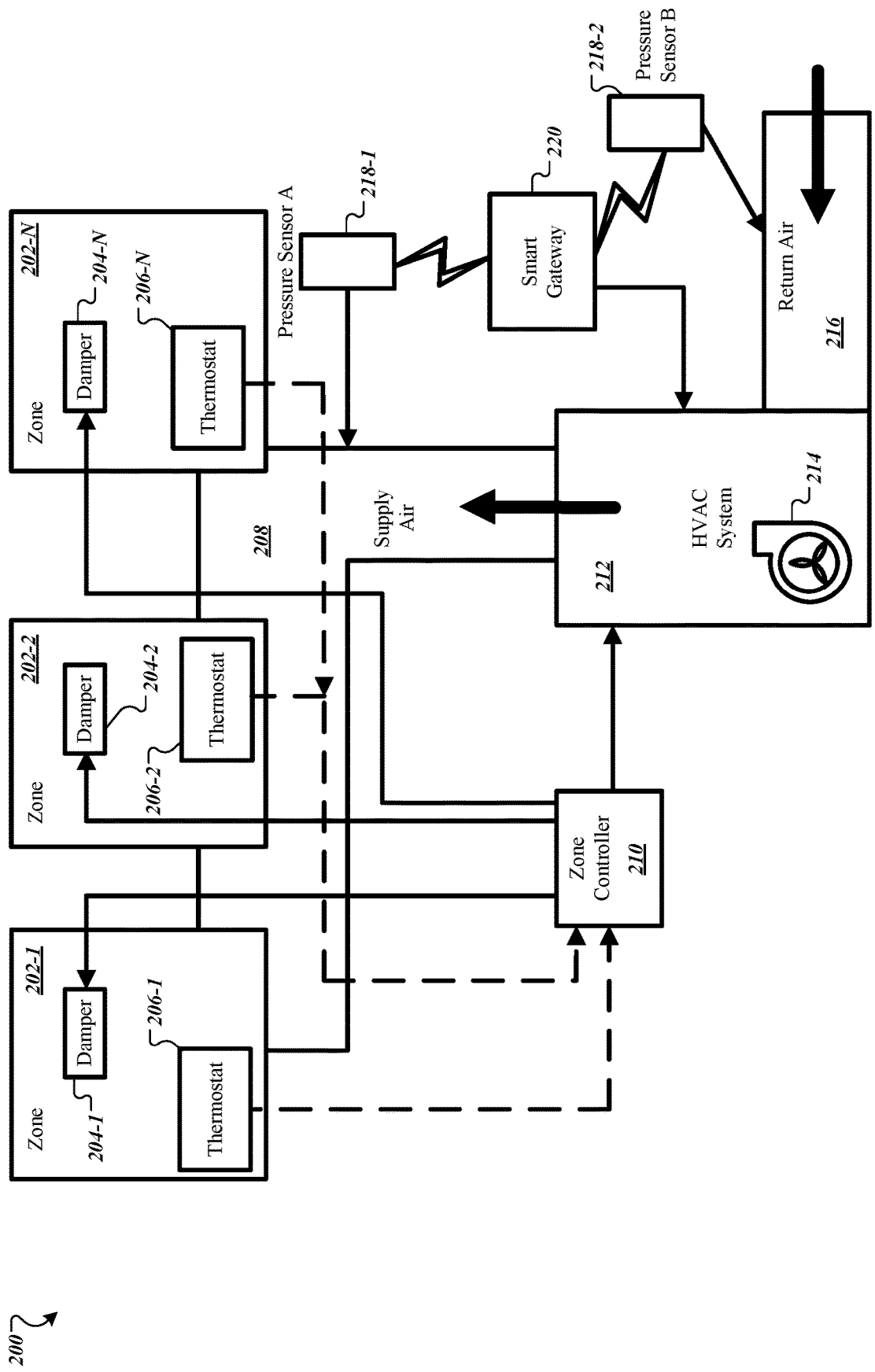
FIG. 2A is a contextual diagram of an example system for monitoring HVAC system zoning properties.

FIG. 2A is a contextual diagram of an example system 200 for monitoring HVAC zoning properties. System 200 is similar to system 100. System 200 includes various zones in a monitored property and a corresponding HVAC system that provides conditioned air to the zones. For example, system 200 illustrates zones 202-1, 202-2, and 202-N controlled by corresponding thermostats in each of the zones. The number of zones in the monitored property may include two zones 202-1 and 202-2 or more than three zones and range from one to N, where N is a positive integer. System 200 illustrates how various zones can be controlled by a zone controller 210 in response to thermostat calls in the respective zones.

For example, zone 202-1 may include thermostat 206-1; zone 202-2 may include thermostat 206-2; and, zone 202-N may include thermostat 206-N. As the thermostat corresponding to the zones each send requests to the HVAC system 212 for various temperatures, the HVAC system 212 can provide an airflow of a particular temperature to that zone.

Each zone additionally includes a damper connected to the air supply. A damper can be a valve or plate that stops or regulates the flow of air from the air supply. The damper may be used to cut off forced air (heating or cooling) to an unused room, or to regulate room-by-room temperature and climate control. For example, zone 202-1 may include damper 204-1; zone 202-2 may include damper 204-2; and, zone 202-N may include damper 204-N.

In some cases, a thermostat corresponding to a particular zone may request a particular temperature. The other zones in the monitored property may be set at a different temperature. For example, the thermostat 206-1 may be set to 75 degrees F., while thermostats 206-2 and 206-N may be set to 70 degrees F. Thus, the zone controller 210 can provide an instruction to the HVAC system 212 to provide air to the supply air duct 208 for the desired air to flow into the zone 202-1 to cause the zone 202-1 to have a temperature of 75 degrees F., approximately. The zone controller 210 can open the damper 204-1 and close dampers 204-2 and 204-N so air can flow into zone 202-1 and not into zones 202-2 and 202-N.

In some implementations, the dampers can be weighted dampers that can be left open. However, in these cases, the HVAC system 212 is typically sized to output a fixed volume of air for a given volume of space in a monitored property (e.g., each of the zones). The HVAC system 212 may not have any knowledge that certain zones have been closed off. As a result, the fan may be producing more air than needed and a back pressure from the closed off branches (e.g., zone 202-2 and zone 202-N) may be generated on the closed dampers, putting more pressure on the HVAC system 212. As the pressure on the dampers increase, the force created by the pressure can cause the dampers to open when the pressure builds up, e.g., is greater than a threshold amount. Additionally, the HVAC system 212 may waste energy by providing air for three zones, when two of three dampers are in fact closed (unbeknownst to the HVAC system 212).

Thus, to reduce energy use, e.g., waste, in the system 200, the smart gateway 220 can be used to monitor pressure throughout the system 200 to modulate fan speeds based on pressure thresholds exceeded by zone branches being closed. The smart gateway 220 is capable of communicating with the HVAC system 212, with a link module (e.g., link module 140) connected to the HVAC system 212, or both, using the HVAC system's 212 proprietary control language. By monitoring the pressure buildup throughout the system 200, the life of the HVAC system 212 can be extended.

In response to monitoring the pressure throughout the system 200, the smart gateway 220 can vary the speed of the fan 214. In particular, the smart gateway 220 includes the functionality to turn fan speed on high, high medium, medium, medium-low, low-speed, or another appropriate speed. The smart gateway 220 can vary the fan speed, vary the duty cycle of the fan speed, ramp the fan speed up, or ramp the fan speed down.

For example, the smart gateway 220 can communicate with one or more pressure sensors located in the supply air duct 208 and the return air duct 216. As illustrated in system 200, supply air duct 208 includes a pressure sensor 218-1 and return air duct 216 includes a pressure sensor 218-2. In some examples, the supply air duct 208 and return air duct 216 may include more than one pressure sensor located in the vents.

The smart gateway 220 can analyze the pressure from the pressure sensors 218-1 and 218-2 to determine an optimal pressure for the system 200. For example, an HVAC technician can set a threshold pressure for the system 200, e.g., as the optimal running pressure. The pressure can be a pressure range. The threshold pressure can correspond to an optimal backpressure to minimize energy wasted by the HVAC system 212.

In some implementations, the smart gateway 220 can set the threshold pressure and adjust the threshold pressure over time. For example, the smart gateway 220 can analyze the amount of energy utilized by the HVAC system 212 at a particular time that an amount of backpressure is built. The smart gateway 220 can select the amount of backpressure buildup when the energy usage is at its lowest point or the amount of backpressure buildup when the energy usage averages over a particular period of time. The smart gateway 220 can continuously monitor the pressure threshold value and change it based on energy requirements and a pressure amount.

For example, the smart gateway 220 can receive pressure information from pressure sensor 218-1 monitoring the supply air duct 208 and pressure sensor 218-2 monitoring the return air duct 216. In some implementations, the smart gateway 220 can compare the pressure from the pressure sensor 218-1 monitoring the supply air duct 208 to the pressure threshold and compare the pressure from the pressure sensor 218-2 monitoring the return air duct 216 to the pressure threshold. In some implementations, the smart gateway 220 can sum the pressure from pressure sensors monitoring the supply air duct 208 and return air duct 216 and compare the summed pressure to the pressure threshold. If the received pressure is greater than the pressure threshold, or otherwise outside a threshold pressure range, then the smart gateway 220 can transmit a notification to the HVAC fan 214 through the link module connected to the HVAC system 212 to lower the speed of the fan 214 until the received pressure is below the pressure threshold or within the threshold pressure range. Thus, the HVAC system 212 can reduce energy waste when supplying forced air through the supply air duct 208 when one or more of the dampers 204 are closed.

Figure 2B:
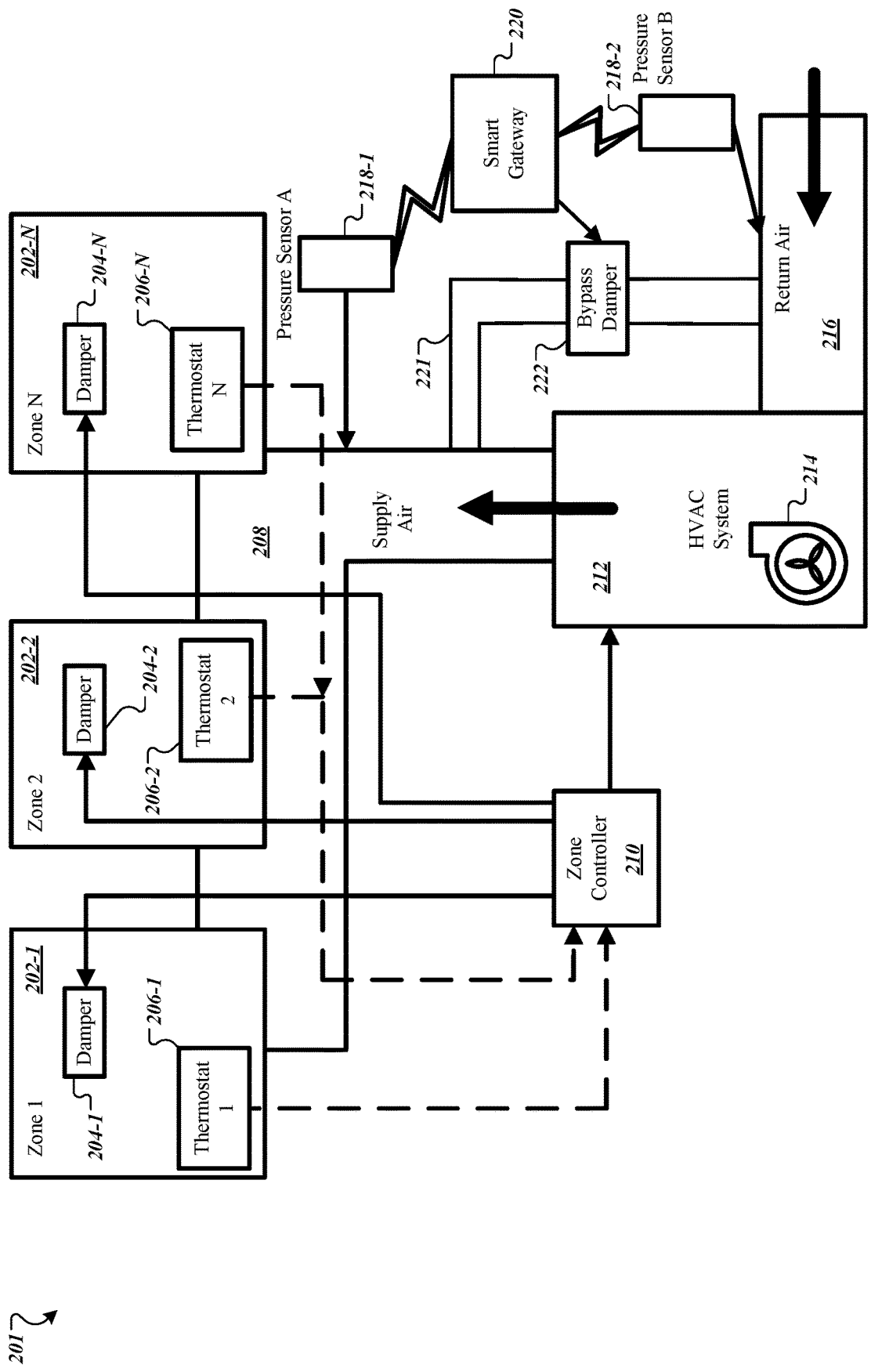
FIG. 2B is another contextual diagram of an example system for monitoring HVAC system zoning properties.

FIG. 2B is another contextual diagram of an example system 201 for monitoring HVAC system zoning properties. System 201 can be similar to systems 100 and 200. System 201 includes various zones (e.g., zones 202-1, 202-2, and 202-N) in a monitored property and a corresponding HVAC system 212 that provides forced air to the various zones 202-1, 202-2, and 202-N. Additionally, system 201 includes a bypass air duct 221 connected between the supply air duct 208 and the return air duct 216.

An HVAC technician can install a bypass air duct 221 between the supply air duct 208 and the return air duct 216 with a bypass damper 222 to regulate the airflow in the system 201. Similar to system 200, the smart gateway 220 can monitor the pressure sensors in the supply air duct 208 and the return air duct 216 and modulate the position of the bypass damper 222 based on the accumulated pressure, e.g., in the air supply 208. By installing the bypass damper 222 and the bypass air duct 221, the amount of back pressure can be reduced off the dampers 204-1 through 204-N in the corresponding zones 202-1 through 202-N, e.g., for which ever dampers. Air forced through the system 201 will move to the path of least resistance and with a bypass air duct 221, pressure built surrounding the dampers can be reduced, e.g., substantially.

The smart gateway 220 can adjust the bypass damper 222 to reduce the pressure in the system 201. For example, if the smart gateway 220 determines the amount of pressure found in the supply air duct 208 and the return air duct 216 exceeds the pressure threshold, the smart gateway 220 can adjust a valve of the bypass damper to allow more air to flow through the bypass air duct 221. In some implementations, the smart gateway 220 may adjust the speed of fan 214, e.g., if opening of a valve of the bypass damper 222 does not reduce the pressure in the system 201 below the pressure threshold. In some implementations, the smart gateway 220 can adjust the speed of fan 214 in conjunction with opening the bypass damper 222. For example, the smart gateway 220 can adjust the fan speed to a low speed and open the valve of the bypass damper 222 to 75% if the smart gateway 220 detects the pressure buildup is above a 50% pressure threshold. The smart gateway 220 can measure static pressure in the HVAC system 212 in Pascal's or any other appropriate unit of measurement.

FIG. 3 is a flowchart of an example process 300 for generating an alert associated with an HVAC system. The alert can be generated in response to controlling settings of the HVAC system. Generally, the process 300 includes providing control information to an HVAC system of a property for controlling settings of the HVAC system; in response to providing control information to the HVAC system, receiving data representing an error associated with controlling settings of the HVAC system; in response to receiving the data representing the error associated with the HVAC system, generating an alert corresponding to the error associated with the HVAC system; and, providing the alert corresponding to the error associated with the HVAC system to a device to cause the device to present information about the error. The device can be operated by an owner of the property or an HVAC dealer and enable the user of the device to fix the error.

During 302, the control unit server 104 provides control information to an HVAC system 124 that indicates a property for a control setting of the HVAC system 124. The control unit server 104 can transmit messages or notifications to the HVAC system 124 through the link module 140 based on one or more control setting properties. For example, the control unit server 104 may transmit one or more messages or notifications to the HVAC system 124 through the link module 140 based on a change in temperature or airflow determined by a thermostat or corresponding application that was indicated in user input by the property owner 120, based on instruction from the HVAC technician 160 input into a corresponding device or application, based on instruction from a user located at the security system 154 input into a corresponding device or application, or based on a set schedule, e.g., designated by the property owner 120. The messages or notifications provided by the control unit server 104 can change one or more parameters of the HVAC system 124. For example, the messages can indicate to change the speed of fan 132, change the temperature of the thermostat 118, change the ramp speed of the fan 132, or change other parameters.

During 304, in response to providing control information to the HVAC system 124, the control unit server 104 receives data representing an error associated with a control setting of the HVAC system 124. In some implementations, the control unit server 104 can receive the data representing the error in a manner other than in response to providing the control information. For instance, the control unit server 104 can receive the data representing the error and, later, provide the control information.

In response to the link module 140 providing the messages and/or notification to the particular component of the HVAC system 124 in a manner suitable for the particular component to understand, e.g., a particular protocol, the link module 140 can receive a response from the particular component. The response can indicate either an error message or a confirmation message. In particular, an error message can indicate an error that the setting change did not take place due to an error with the particular component or another particular component. For example, the error message can be an error code, such as "BROKENFAN," or a code that represents an error. The confirmation message can indicate that the setting change took place corresponding to the particular component. The link module 140 can then provide the error message or the confirmation message, or both when there are multiple setting changes, back to the control unit server 104 over the network 152.

During 306, in response to receiving the data representing the error associated with the HVAC system 124, the control unit server 104 generates an alert corresponding to the error associated with the HVAC system 124. In particular, the control unit server 104 generates an alert using the data received from the link module 140 and data from devices in the monitored property 102. The data from the devices in the monitored property 102 can include the data from the sensors 114, the cameras 110 that monitor the HVAC system 124, or both. For example, the control unit server 104 may retrieve recorded media, e.g., a video stream, that was captured by the cameras 110 that monitor the HVAC system 124. The control unit server 104 can retrieve data from pressure sensors, motion sensors, heat sensors surrounding or within the HVAC system 124, or a combination of these. This data can be used to help the control unit server 104 classify the error produced by the HVAC system 124.

The control unit server 104 can generate a user alert, a dealer alert, or both, based on the data. For example, the control unit server 104 analyzes the status of the HVAC system 124 to determine whether an issue exists with the HVAC system 124. In particular, the control unit server 104 classifies the status of the HVAC system 124. The classification can include a particular label or description that describes the status. For example, the classification of the status can include an indication of a broken component within the HVAC system 124, such as "FURNACE" or "FAN"; a textual description that describes the status, such as "Broken Furnace," "Broken Fan," or "Old air filter." The classification can indicate a category with which the status message falls under, such as "broken component," "inefficient component," or a number that represents a type of error, such as "012345" that represents a thermometer without battery. The control unit server 103 can generate multiple classifications corresponding to the status of the HVAC system 124 that can include a code, a textual description, and a number, for example. The security system 154 can perform similar functions compared to the control unit server 104.

During 308, the control unit server 104 provides the alert corresponding to the error associated with the HVAC system 124 to a device to cause the device to present information about the error. The device can be operated by an owner of the property or an HVAC dealer to enable the user to fix the error. In some examples, the control unit server 104 can provide the alert, or different alerts corresponding to the error, to multiple difference devices. A first device can be operated by the owner of the property. A second device can be operated by an employee of the HVAC dealer.

The control unit server 104 can take corrective action if the generated classification label indicates an issue with the HVAC system 124. In particular, if the classification label indicates an error associated with the HVAC system 124, the control unit server 104 can contact the HVAC dealers 158 to dispatch an HVAC technician 160 to the monitored property 102. In some examples, the control unit server 104 can transmit a notification to the security system 154 to contact the HVAC dealers 158.

The control unit server 104, or the security system 154, can check inventory for parts associated with the issue with the HVAC system 124. For instance, the control unit server 104 or the security system 154 can determine one or more parts commonly used to fix the issue with the HVAC system 124. The server or the system can determine whether those one or more parts are in stock, e.g., for an HVAC dealer, or should be ordered. In some examples, the server or the system can cause delivery of some of the parts to the monitored property.

The control unit server 104 can notify the property owner 120 of the error associated with the HVAC system 124. The property owner 120 may be unaware of the issue with the HVAC system 124.

The control unit server 104 can transmit the generated classification, the raw sensor data, or both, from the monitored property to the security system 154 to store in the HVAC database 156 for later retrieval. The security system 154 can later retrieve this data from the HVAC database 156 for comparing to future potential issues with the HVAC system 124 and other HVAC systems at other corresponding monitored properties 102.

The control unit server 104 can transmit a notification to the client device of the property owner 120 indicating of the error with the HVAC system 124. For example, the notification can recite a "Broken fan in the HVAC system." Alternatively, the control unit server 104 can call the client device 122 and leave an automated voice recording that indicates the fan error exists with his/her HVAC system 124. In some implementations, the security system 154 may notify the property owner 120 of the error and may ask the property owner 120 to determine whether an issue exists with one or more components of his/her HVAC system 124. The security system 154 can additionally ask the property owner 120 whether an HVAC technician, such as HVAC technician 160, should be dispatched to the monitored property 102 to fix the issue with the HVAC system 124.

FIG. 4 is a flowchart of an example process 400 for adjusting dampers of an HVAC system. The dampers can be adjusted in response to detecting exceeding pressure in the air ducts. Generally, the process 400 includes receiving pressure data from one or more sensors monitoring a supply air duct, a return air duct, or both, of an HVAC system at a property that indicates a pressure in the HVAC system; determining, using the pressure data, that the pressure has exceeded a pressure threshold for one or more zone branches of the HVAC system to which the HVAC system should not provide forced air; and in response to determining that the pressure has exceeded the pressure threshold, adjusting an actuator-controlled damper between the supply air duct and the return air duct or adjusting a fan speed of the HVAC system. The process 400 can include determining that the pressure has reduced below the pressure threshold; and, determining to skip further adjustments to the actuator-controlled damper or the fan speed of the HVAC system based on a current value of the pressure.

During 402, the smart gateway 220 receives pressure data from one or more sensors monitoring a supply air duct, a return air duct, or both, of an HVAC system at a property. The pressure data indicates one or more pressures in the HVAC system. For instance, when the pressure data is from one or more sensors that monitor the supply air duct, the pressure data can indicate a pressure in the supply air duct.

In some examples, the pressure data can indicate multiple pressures in the HVAC system. For instance, some pressure data can indicate a pressure in the supply air duct while other pressure data indicates a pressure in the return air duct. Some pressure data can indicate a first pressure in a first portion of the supply air duct while other pressure data indicates a second pressure in a second portion of the supply air duct. The two portions can be for different zones in a building.

In a system, such as system 200, a smart gateway 220 can monitor pressure in the supply air duct 208 and the return air duct 216, and modulate fan speed at the HVAC system 212 based on pressure thresholds exceeded by zone branches being closed. Each zone in the system 200 can be set to various temperatures. The zone controller 210 can be used to open and close, partially or substantially completely, dampers corresponding to various zones so that forced air can flow in the zones at the desired temperature. A damper can be substantially closed or substantially open due to minor defects in the damper, another object that is blocking the damper, or pressure on the damper, e.g., that prevents the damper from closing completely.

In some cases, the dampers corresponding to particular zones may be closed, causing an HVAC system 212 that is designed to output a fixed volume of air for a given space of the system 200 (e.g., each of the zones) to not recognize when back pressure builds at the dampers that have closed. Thus, the HVAC system 212 can waste energy by blowing excess air for zones that have been closed off.

To reduce energy waste, the smart gateway 220 can monitor pressure throughout the property using one or more pressure sensors. In particular, the smart gateway 220 can receive pressure data from one or more pressure sensors found in the supply air duct 208, pressure data from one or more pressure sensors found in the return air duct 216, or both. This data can be used to adjust the HVAC system 212 which can reduce energy usage.

During 404, the smart gateway 220 determines, using the pressure data, that the pressure satisfies a pressure threshold for the HVAC system. The pressure can satisfy the pressure threshold when the pressure exceeds the pressure threshold. This can indicate that the pressure is too high for the HVAC system or a portion of the HVAC system, such as a supply air duct, that provides air to one or more zones identified as zones to which the HVAC system currently should not provide forced air. The pressure can satisfy the pressure threshold when the pressure is below the threshold pressure, e.g., a second threshold pressure that is different than a first threshold pressure that is satisfied when exceeded. This can indicate that the pressure is too low for the HVAC system or a portion of the HVAC system, such as a supply air duct, that provides air to one or more zones identified as zones to which the HVAC system currently should not provide forced air. This can occur when the HVAC system has three zones and the HVAC system initially should not provide air to two of the three zones but then only does not provide air to one of the three zones.

For instance, the HVAC system can determine that the temperature in one of the three zones satisfies a threshold temperature and being providing air to that zone. During this time period, the HVAC system can determine that temperatures for the other two zones each do not satisfy respective threshold temperatures, e.g., based on temperature settings for those zones, and that the HVAC system should not provide air to those two zones, e.g., that the temperatures for these zones is appropriate given the temperature settings. As a result, the HVAC system can reduce the air pressure in the supply air duct. Then the HVAC system can determine that a second temperature for one of the two zones satisfies a corresponding threshold temperature and that the HVAC system should begin to provide forced air to the zone. As a result, the air pressure in the supply air duct may be too low, and the HVAC system can determine to increase the air pressure.

In response to receiving the pressure data from the pressure sensors in the supply air duct 208 and the pressure data from the pressure sensors in the return air duct 216, the smart gateway 220 can analyze the pressure data and compare the pressure with one or more pressure thresholds. In some implementations, the smart gateway 220 can compare the pressure from the pressure sensor 218-1 monitoring the supply air duct 208 to a first pressure threshold and compare the pressure from the pressure sensor 218-2 monitoring the return air duct 216 to a second pressure threshold. The first pressure threshold and the second pressure threshold can both have the same threshold value. In some implementations, the smart gateway 220 can sum the pressure from pressure sensors monitoring the supply air duct 208, the return air duct 216, or both. The smart gateway 220 can compare the summed pressure to the pressure threshold.

The pressure can be for the HVAC system or a portion of the HVAC system. For instance, the HVAC system can have a pressure threshold for the overall airflow in the HVAC system and compare overall pressure data for the HVAC system with the pressure threshold. In some examples, the HVAC system can have a pressure threshold that the HVAC system compares with pressures for different portions for the HVAC system. For example, a first portion of the HVAC system, e.g., one or more supply ducts, can provide forced air to a first zone and a second portion of the HVAC system, e.g., one or more supply ducts, can provide forced air to a second zone. The first portion and the second portion can include some of the same supply ducts, different supply ducts, or both. The HVAC system can have one or more sensors in each of the first portion and the second portion.

During 406, in response to determining that the pressure satisfies the pressure threshold, the smart gateway 220 adjusts an actuator-controlled damper between the supply air duct and the return air duct or adjusts a fan speed of the HVAC system. This can reduce pressure in the HVAC system. If the received pressure is greater than the pressure threshold, then the smart gateway 220 can transmit a notification to the HVAC fan 214 through the link module connected to the HVAC system 212 to lower the speed of the fan 214. Similarly, the smart gateway 220 can transmit a notification to the HVAC fan 214 through the link module to increase the fan speed when the pressure is less than a minimum pressure threshold.

In some examples, in response to determining the pressure data satisfies the pressure threshold, the smart gateway 220 can adjust a valve of the bypass damper 222 to allow more air, or less air, to flow through the bypass air duct 221. In some implementations, the smart gateway 220 may adjust the speed of fan 214 if opening or closing, both of which can be partially, of a valve of the bypass damper 222 does sufficiently adjust the pressure in the system 201 to not satisfy the pressure threshold. In some implementations, the smart gateway 220 can adjust the speed of fan 214 in conjunction with opening or closing, both of which can be at least partially, the bypass damper 222.

During 408, the smart gateway 220 determines that the pressure in the HVAC system does not satisfy the pressure threshold. The smart gateway 220 can continuously monitor the data from the pressure sensors, e.g., receive pressure data periodically such as every minute, while adjusting the speed of fan 214, adjusting the valve of the bypass damper 222, or both. The fan 214 speed adjustment, the value adjustment, or both, can occur less frequently than the smart gateway 220 receipt of pressure data from the pressure sensors.

In some examples, the pressure does not satisfy the pressure threshold when the pressure is less than, equal to, or either, a maximum threshold pressure. In some examples, the pressure does not satisfy the pressure threshold when the pressure is more than, equal to, or either, a minimum pressure threshold.

Once the data from the pressure sensors indicates that the pressure does not satisfy the pressure threshold, the smart gateway 220 can stop adjusting, e.g., reducing, the fan speed, stop adjusting the valve of the bypass damper 222, or both. In some examples, in response to determining the data from the pressure sensors indicate the pressure in the system 200 does not satisfy the pressure threshold, the smart gateway 220 may increase or decrease the fan speed and/or close or open the valve of the bypass damper 222 until the data from the pressure sensors indicate the pressure in the system 200 satisfies the pressure threshold. The opening or closing of the valve can be partial, e.g., as necessary given the threshold pressure or threshold pressures.

During 410, the smart gateway 220 determines to skip further adjustments to the actuator-controlled damper or the fan speed of the HVAC system based on a current value of the pressure. This can occur in response to the smart gateway 220 determining that the pressure does not satisfy the pressure threshold.

Figure 5:
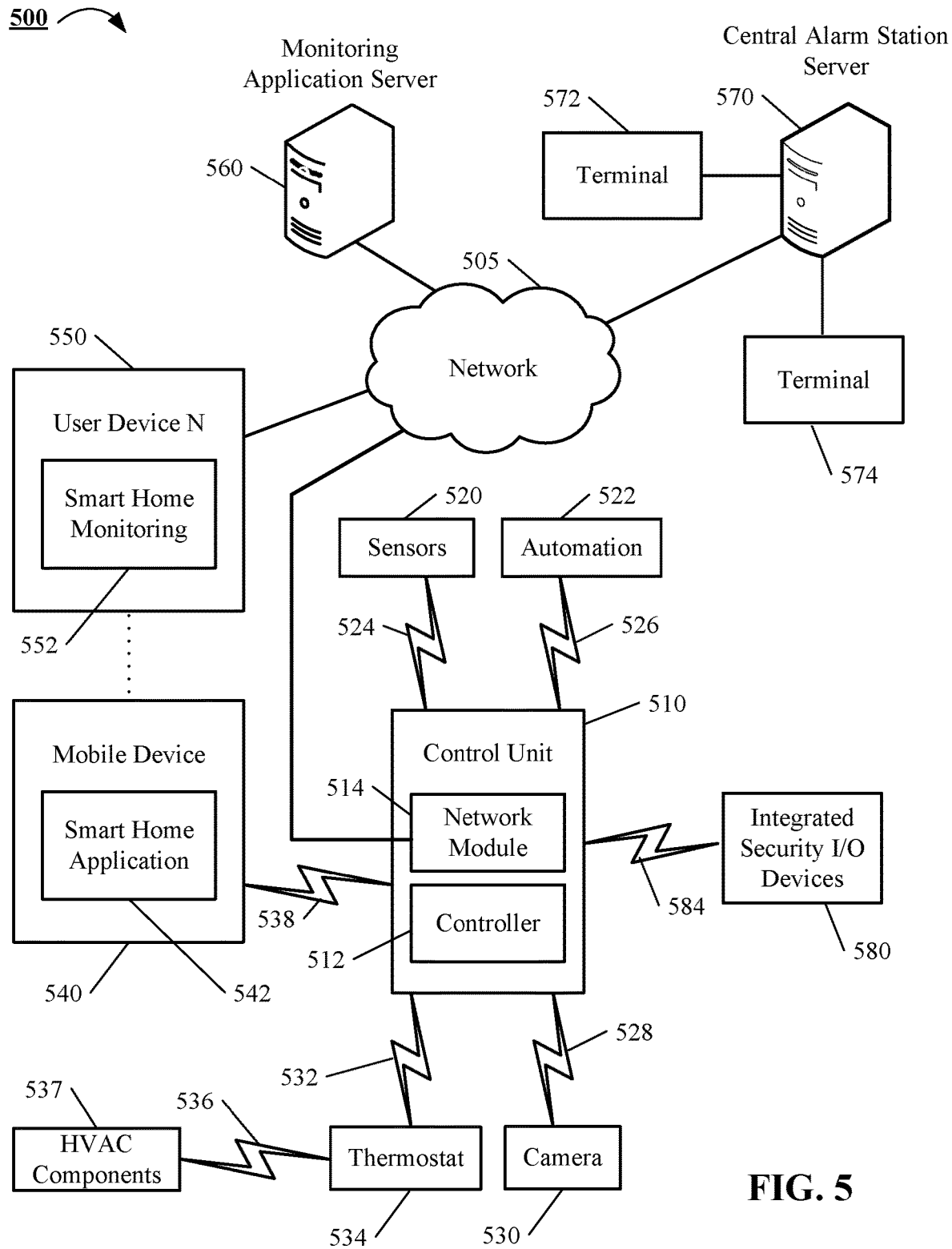
FIG. 5 is a block diagram of an example of a home monitoring system that may utilize various components to monitor an HVAC.

FIG. 5 is a block diagram of an example of a home monitoring system 500 that may utilize various components to monitor an HVAC system 124. The home monitoring system 500 includes a network 505, a control unit server 510, one or more user devices 540 and 550, a monitoring application server 560, and a central alarm station server 570. In some examples, the network 505 facilitates communications between the control unit server 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit server 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit server 510 includes a controller 512 and a network module 514. The controller 512 is configured to control an HVAC system that includes the control unit server 510. In some examples, the controller 512 may include a processor or other control circuitry configured to execute instructions of a program that controls operation of an HVAC system. In these examples, the controller 512 may be configured to receive input from sensors, thermostats, or other devices included in the HVAC system and control operations of devices included in the household (e.g., a shower head, a faucet, a dishwasher, etc.). For example, the controller 512 may be configured to control operation of the network module 514 included in the control unit server 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit server 510 to communicate over a local area network and/or the Internet. The network module 514 also may be a voiceband modem configured to enable the alarm panel to communicate over the telephone lines of Plain Old Telephone Systems (POTS).

The HVAC system that includes the control unit server 510 includes one or more sensors. For example, the monitoring system may include multiple sensors 520. The sensors 520 may include a temperature sensor, a humidity sensor, a leak detector (or water sensor), or any other type of sensor included in an HVAC system 124. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit server 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol. Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the control unit server 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a HVAC system monitored by the control unit server 510. The camera 530 may be configured to capture single, static images of the area and also video images of the area in which multiple images of the area are captured at a relatively high frequency (e.g., thirty images per second). The camera 530 may be controlled based on commands received from the control unit server 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit server 510. The camera 530 may employ a small solar cell to recharge the battery when light is available. Alternatively, the camera 530 may be powered by the controller 512's power supply if the camera 530 is co-located with the controller 512.

In some implementations, the camera 530 communicates directly with the monitoring application server 560 over the Internet. In these implementations, image data captured by the camera 530 does not pass through the control unit server 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit server 510 and can control the environmental (e.g., temperature) settings based on commands received from the control unit server 510.

In some implementations, the thermostat 534 is a dynamically programmable thermostat and can be integrated with the control unit server 510. For example, the dynamically programmable thermostat 534 can include the control unit server 510, e.g., as an internal component to the dynamically programmable thermostat 534. In addition, the control unit server 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580 and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit server 510, the one or more user devices 540 and 550, and the central alarm station server 570 over the network 505. For example, the monitoring application server 560 may be configured to monitor events (e.g., alarm events) generated by the control unit server 510. In this example, the monitoring application server 560 may exchange electronic communications with the network module 514 included in the control unit server 510 to receive information regarding events (e.g., HVAC control events) detected by the control unit server 510. The monitoring application server 560 also may receive information regarding events (e.g., HVAC events) from the one or more user devices 540 and 550.

In some examples, the monitoring application server 560 may route HVAC data received from the network module 514 or the one or more user devices 540 and 550 to the central alarm station server 570. For example, the monitoring application server 560 may transmit the HVAC data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit server 510 or the one or more user devices 540 and 550.

The central alarm station server 570 is an electronic device configured to provide alarm monitoring service by exchanging communications with the control unit server 510, the one or more mobile devices 540 and 550, and the monitoring application server 560 over the network 505. For example, the central alarm station server 570 may be configured to monitor HVAC events generated by the control unit server 510. In this example, the central alarm station server 570 may exchange communications with the network module 514 included in the control unit server 510 to receive information regarding HVAC events detected by the control unit server 510. The central alarm station server 570 also may receive information regarding HVAC events from the one or more mobile devices 540 and 550 and/or the monitoring application server 560.

The central alarm station server 570 is connected to multiple terminals 572 and 574. The terminals 572 and 574 may be used by operators to process HVAC events. For example, the central alarm station server 570 may route HVAC data to the terminals 572 and 574 to enable an operator to process the HVAC data. The terminals 572 and 574 may include general-purpose computers (e.g., desktop personal computers, workstations, or laptop computers) that are configured to receive HVAC data from a server in the central alarm station server 570 and render a display of information based on the HVAC data. For instance, the controller 512 may control the network module 514 to transmit, to the central alarm station server 570, HVAC data indicating that a sensor 520 detected a flow rate of air in the air handling unit 148. The central alarm station server 570 may receive the HVAC data and route the HVAC data to the terminal 572 for processing by an operator associated with the terminal 572. The terminal 572 may render a display to the operator that includes information associated with the HVAC event (e.g., the flow rate, the air duct the flow rate came from, the temperature of the air in the air duct, etc.) and the operator may handle the HVAC event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit server 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit server 510 using the communication link 538. For instance, the one or more user devices 540 and 550 may communicate with the control unit server 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit server 510, the one or more user devices 540 and 550 may communicate directly with the sensors and other devices controlled by the control unit server 510. In some implementations, the one or more user devices 540 and 550 replace the control unit server 510 and perform the functions of the control unit server 510 for local monitoring and long range/offsite communication.

In other implementations, the one or more user devices 540 and 550 receive monitoring system data captured by the control unit server 510 through the network 505. The one or more user devices 540, 550 may receive the data from the control unit server 510 through the network 505 or the monitoring application server 560 may relay data received from the control unit server 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit server 510 directly (e.g., through link 538) or through the monitoring application server 560 (e.g., through network 505) based on a location of the one or more user devices 540 and 550. For instance, when the one or more user devices 540 and 550 are located close to the control unit server 510 and in range to communicate directly with the control unit server 510, the one or more user devices 540 and 550 use direct communication. When the one or more user devices 540 and 550 are located far from the control unit server 510 and not in range to communicate directly with the control unit server 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, and the camera 530. The one or more user devices 540 and 550 receive data directly from the sensors 520, the module 522, and the camera 530 and sends data directly to the sensors 520, the module 522, and the camera 530. The one or more user devices 540, 550 provide the appropriate interfaces/processing to provide visual surveillance and reporting.

In other implementations, the system 500 further includes network 505 and the sensors 520, the module 522, the camera 530, and the thermostat 534 are configured to communicate sensor and image data to the one or more user devices 540 and 550 over network 505 (e.g., the Internet, cellular network, etc.). In yet another implementation, the sensors 520, the module 522, the camera 530, and the thermostat 534 (or a component, such as a bridge/router) are intelligent enough to change the communication pathway from a direct local pathway when the one or more user devices 540 and 550 are in close physical proximity to the sensors 520, the module 522, the camera 530, and the thermostat 534 to a pathway over network 505 when the one or more user devices 540 and 550 are farther from the sensors 520, the module 522, the camera 530, and the thermostat 534. In some examples, the system leverages GPS information from the one or more user devices 540 and 550 to determine whether the one or more user devices 540 and 550 are close enough to the sensors 520, the module 522, the camera 530, and the thermostat 534 to use the direct local pathway or whether the one or more user devices 540 and 550 are far enough from the sensors 520, the module 522, the camera 530, and the thermostat 534 that the pathway over network 505 is required. In other examples, the system leverages status communications (e.g., pinging) between the one or more user devices 540 and 550 and the sensors 520, the module 522, the camera 530, and the thermostat 534 to determine whether communication using the direct local pathway is possible. If communication using the direct local pathway is possible, the one or more user devices 540 and 550 communicate with the sensors 520, the module 522, the camera 530, and the thermostat 534 using the direct local pathway. If communication using the direct local pathway is not possible, the one or more user devices 540 and 550 communicate with the sensors 520, the module 522, the camera 530, and the thermostat 534 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A system comprising one or more computers and one or more storage devices on which are stored instructions that are operable, when executed by the one or more computers, to cause the one or more computers to perform operations comprising:
   receiving a first pressure value from a first sensor monitoring a supply air duct and a second pressure value from a second sensor monitoring a return air duct of an HVAC system at a property;
   determining a sum of the first pressure value from the first sensor monitoring the supply air duct and the second pressure value from the second sensor monitoring the return air duct, the sum indicating a pressure in the HVAC system;
   determining that the sum of the first pressure value and the second pressure value satisfies a pressure threshold for the HVAC system; and
   in response to determining that the sum of the first pressure value and the second pressure value satisfies the pressure threshold, adjusting an actuator-controlled damper between the supply air duct and the return air duct or adjusting a fan speed of the HVAC system.

2. The system of claim 1, the operations comprising:
   determining that the pressure does not satisfy the pressure threshold; and
   determining to skip further adjustments to the actuator-controlled damper or the fan speed of the HVAC system based on a current value of the pressure.

3. The system of claim 1, wherein determining to skip the further adjustments to the actuator-controlled damper or the fan speed of the HVAC system based on the current value of the pressure is responsive to determining that the pressure has reduced below the pressure threshold.

4. The system of claim 1, wherein adjusting the actuator-controlled damper between the supply air duct and the return air duct or adjusting the fan speed of the HVAC system comprises adjusting a valve of the actuator-controlled damper between the supply air duct and the return air duct.

5. The system of claim 4 wherein:
   determining that the pressure satisfies the pressure threshold for the HVAC system comprises determining that the pressure exceeds the pressure threshold for the HVAC system; and
   adjusting the valve of the actuator-controlled damper between the supply air duct and the return air duct comprises at least partially opening the valve of the actuator-controlled damper between the supply air duct and the return air duct.

6. The system of claim 4 wherein:
   determining that the pressure satisfies the pressure threshold for the HVAC system comprises determining that the pressure does not exceed the pressure threshold for the HVAC system; and
   adjusting the valve of the actuator-controlled damper between the supply air duct and the return air duct comprises at least partially closing the valve of the actuator-controlled damper between the supply air duct and the return air duct.

7. The system of claim 1, wherein:
   determining that the pressure satisfies the pressure threshold for the HVAC system comprises determining that the pressure exceeds the pressure threshold for the HVAC system; and
   adjusting the actuator-controlled damper between the supply air duct and the return air duct or adjusting the fan speed of the HVAC system comprises reducing the fan speed of the HVAC system.

8. The system of claim 1, wherein:
   determining that the pressure satisfies the pressure threshold for the HVAC system comprises determining that the pressure does not exceed the pressure threshold for the HVAC system; and
   adjusting the actuator-controlled damper between the supply air duct and the return air duct or adjusting the fan speed of the HVAC system comprises increasing the fan speed of the HVAC system.

9. The system of claim 1, wherein adjusting the actuator-controlled damper between the supply air duct and the return air duct or adjusting the fan speed of the HVAC system comprises adjusting the actuator-controlled damper between the supply air duct and the return air duct and adjusting the fan speed of the HVAC system.

10. The system of claim 1, wherein:
    receiving the first pressure value from the first sensor monitoring the supply air duct comprises receiving the first pressure value from the first sensor that monitors a portion of the supply air duct that provides air to one or more zones identified as zones to which the HVAC system currently should not provide forced air, the first pressure value indicating the pressure for the portion of the supply air duct; and
    determining that the pressure satisfies the pressure threshold for the HVAC system comprises determining that the pressure of the portion of the supply air duct that provides air to the one or more zones identified as zones to which the HVAC system currently should not provide forced air satisfies the pressure threshold.

11. A computer-implemented method comprising:
    receiving a first pressure value from a first sensor monitoring a supply air duct and a second pressure value from a second sensor monitoring a return air duct of an HVAC system at a property;
    determining a sum of the first pressure value from the first sensor monitoring the supply air duct and the second pressure value from the second sensor monitoring the return air duct, the sum indicating a pressure in the HVAC system;
    determining that the sum of the first pressure value and the second pressure value satisfies a pressure threshold for the HVAC system; and
    in response to determining that the sum of the first pressure value and the second pressure value satisfies the pressure threshold, adjusting an actuator-controlled damper between the supply air duct and the return air duct or adjusting a fan speed of the HVAC system.

12. The method of claim 11, comprising:
    determining that the pressure does not satisfy the pressure threshold; and
    determining to skip further adjustments to the actuator-controlled damper or the fan speed of the HVAC system based on a current value of the pressure.

13. The method of claim 12, wherein determining to skip the further adjustments to the actuator-controlled damper or the fan speed of the HVAC system based on the current value of the pressure is responsive to determining that the pressure has reduced below the pressure threshold.

14. The method of claim 11, wherein adjusting the actuator-controlled damper between the supply air duct and the return air duct or adjusting the fan speed of the HVAC system comprises adjusting a valve of the actuator-controlled damper between the supply air duct and the return air duct.

15. The method of claim 14, wherein:
    determining that the pressure satisfies the pressure threshold for the HVAC system comprises determining that the pressure exceeds the pressure threshold for the HVAC system; and
    adjusting the valve of the actuator-controlled damper between the supply air duct and the return air duct comprises at least partially opening the valve of the actuator-controlled damper between the supply air duct and the return air duct.

16. The method of claim 14, wherein:
    determining that the pressure satisfies the pressure threshold for the HVAC system comprises determining that the pressure does not exceed the pressure threshold for the HVAC system; and
    adjusting the valve of the actuator-controlled damper between the supply air duct and the return air duct comprises at least partially closing the valve of the actuator-controlled damper between the supply air duct and the return air duct.

17. The method of claim 11, wherein:
    determining that the pressure satisfies the pressure threshold for the HVAC system comprises determining that the pressure exceeds the pressure threshold for the HVAC system; and
    adjusting the actuator-controlled damper between the supply air duct and the return air duct or adjusting the fan speed of the HVAC system comprises reducing the fan speed of the HVAC system.

18. The method of claim 11, wherein:
    determining that the pressure satisfies the pressure threshold for the HVAC system comprises determining that the pressure does not exceed the pressure threshold for the HVAC system; and
    adjusting the actuator-controlled damper between the supply air duct and the return air duct or adjusting the fan speed of the HVAC system comprises increasing the fan speed of the HVAC system.

19. The method of claim 11, wherein adjusting the actuator-controlled damper between the supply air duct and the return air duct or adjusting the fan speed of the HVAC system comprises adjusting the actuator-controlled damper between the supply air duct and the return air duct and adjusting the fan speed of the HVAC system.

20. A non-transitory computer storage medium encoded with instructions that, when executed by one or more computers, cause the one or more computers to perform operations comprising:
    receiving a first pressure value from a first sensor monitoring a supply air duct and a second pressure value from a second sensor monitoring a return air duct of an HVAC system at a property;
    determining a sum of the first pressure value from the first sensor monitoring the supply air duct and the second pressure value from the second sensor monitoring the return air duct, the sum indicating a pressure in the HVAC system;

determining that the sum of the first pressure value and the second pressure value satisfies a pressure threshold for the HVAC system; and in response to determining that the sum of the first pressure value and the second pressure value satisfies the pressure threshold, adjusting an actuator-controlled damper between the supply air duct and the return air duct or adjusting a fan speed of the HVAC system.

* * * * *